(12) United States Patent
Niikura et al.

(10) Patent No.: US 8,758,870 B2
(45) Date of Patent: Jun. 24, 2014

(54) LIQUID CRYSTAL COMPOSITION, LIQUID CRYSTAL ELEMENT, AND LIQUID CRYSTAL DISPLAY DEVICE

(71) Applicant: Semiconductor Energy Laboratory Co., Ltd., Atsugi (JP)

(72) Inventors: Yasuhiro Niikura, Kanagawa (JP); Tetsuji Ishitani, Kanagawa (JP); Tomohiro Tamura, Okinawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/711,940

(22) Filed: Dec. 12, 2012

(65) Prior Publication Data

US 2013/0155368 A1    Jun. 20, 2013

(30) Foreign Application Priority Data

Dec. 16, 2011  (JP) .................................. 2011-275378

(51) Int. Cl.
C09K 19/58   (2006.01)
C09K 19/38   (2006.01)
C09K 19/54   (2006.01)

(52) U.S. Cl.
USPC ........................ 428/1.1; 252/299.01; 349/183

(58) Field of Classification Search
USPC ................ 428/1.1; 252/299.01, 299.5, 299.2; 349/183
See application file for complete search history.

(56) References Cited

U.S. PATENT DOCUMENTS

| 7,576,829 B2 | 8/2009 | Kikuchi et al. |
| 7,648,647 B2 | 1/2010 | Kikuchi et al. |
| 2012/0132855 A1 | 5/2012 | Ishitani et al. |

FOREIGN PATENT DOCUMENTS

| DE | 102008051260 A1 * | 4/2010 |
| JP | 2008-303381 | 12/2008 |
| WO | WO 98-00428 A1 | 1/1998 |
| WO | WO 2005-090520 A1 | 9/2005 |

OTHER PUBLICATIONS

English translation of DE102008051260A1 provided by EPO, 2010.*
Kikuchi et al., "Polymer-Stabilized Liquid Crystal Blue Phases", Nature Materials, Sep. 2002, vol. 1, pp. 64-68.
U.S. Appl. No. 13/543,695, filed Jun. 6, 2012, Filing Receipt, Specification and Drawings.

* cited by examiner

Primary Examiner — Shean C Wu
(74) Attorney, Agent, or Firm — Nixon Peabody LLP; Jeffrey L. Costellia

(57) ABSTRACT

A novel liquid crystal composition that can be used for a variety of liquid crystal devices is provided. A stable liquid crystal element that is driven at low voltage and that withstands physical impact is provided with the use of the novel liquid crystal composition. A highly reliable liquid crystal display device with low power consumption and high display quality is provided with the use of the liquid crystal element. The liquid crystal composition exhibits a blue phase and contains nematic liquid crystal, 1,4:3,6-dianhydro-2,5-bis[4-(n-hexyl-1-oxy)benzoic acid]sorbitol (abbreviation: ISO-$(6OBA)_2$) represented by the structural formula (100) as a first chiral agent, and (4R,5R)-4,5-bis[hydroxy-di(phenanthren-9-yl)methyl]-2,2-dimethyl-1,3-dioxolane (abbreviation: R-DOL-Pn) represented by the structural formula (101) as a second chiral agent.

20 Claims, 9 Drawing Sheets

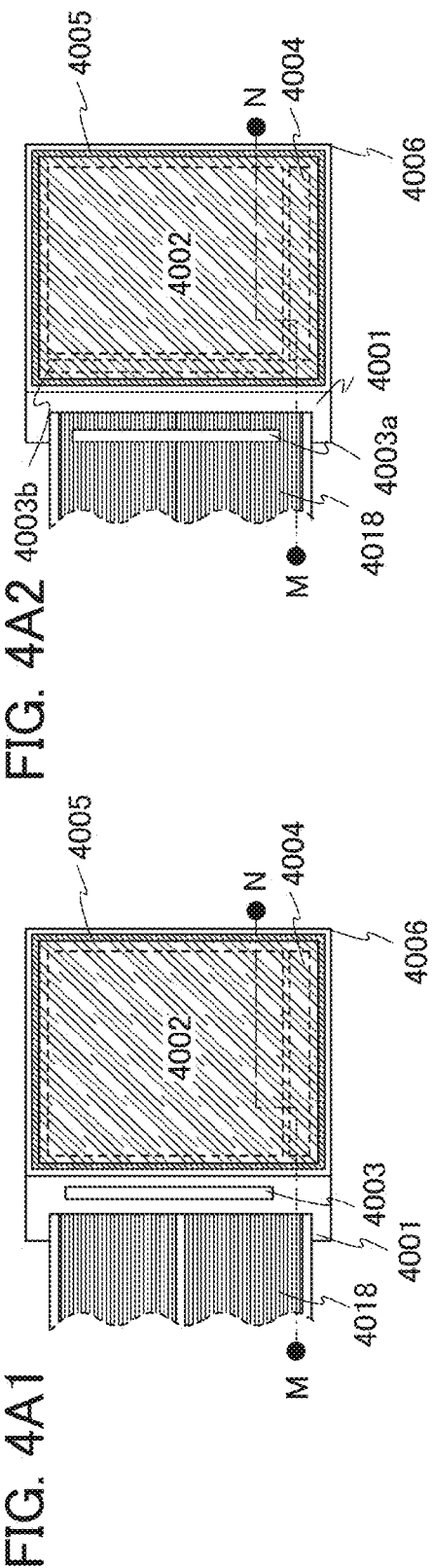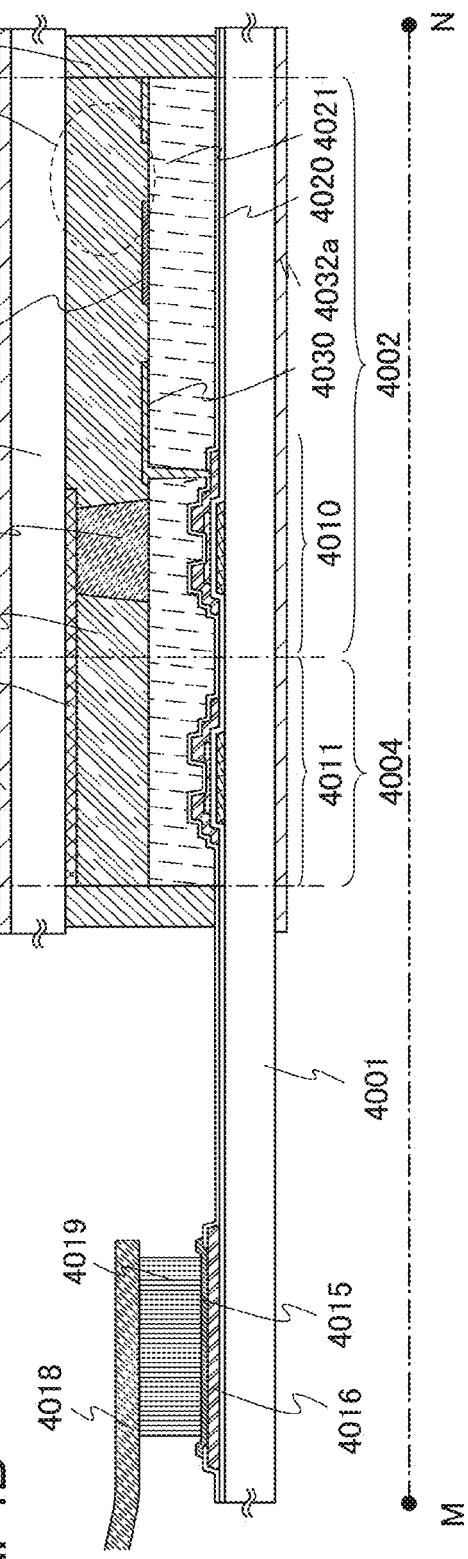

LIQUID CRYSTAL COMPOSITION, LIQUID CRYSTAL ELEMENT, AND LIQUID CRYSTAL DISPLAY DEVICE

BACKGROUND OF THE INVENTION

1. Field of the Invention

The present invention relates to a liquid crystal composition, a liquid crystal element, and a liquid crystal display device, and manufacturing methods thereof.

2. Description of the Related Art

In recent years, liquid crystals have been applied to a variety of devices; in particular, liquid crystal display devices (liquid crystal displays) having advantages of thinness and lightness have been used for displays in a wide range of fields.

For a larger and higher-resolution display screen, shorter response time of liquid crystal has been required, and development thereof has been advanced (for example, see Patent Document 1).

As a display mode of liquid crystal capable of quick response, a display mode using liquid crystal exhibiting a blue phase is given. The mode using liquid crystal exhibiting a blue phase achieves quick response, does not need an alignment film, and provides a wide viewing angle, and thus has been developed more actively for practical use (for example, see Patent Document 2).

REFERENCE

Patent Document

[Patent Document 1] Japanese Published Patent Application no. 2008-303381
[Patent Document 2] PCT International Publication no. 2005-090520

SUMMARY OF THE INVENTION

An object is to provide a novel liquid crystal composition that can be used for a variety of liquid crystal devices.

Liquid crystal elements have been suitably used for touch panels which are handled by touching display screens, mobile devices, and outdoor large display screens. Liquid crystal elements used in such devices are often subjected to physical impact; therefore, the liquid crystal elements are required to withstand physical impact.

Another object of one embodiment of the present invention is to provide a stable liquid crystal element that is driven at low voltage and that withstands physical impact with the use of the novel liquid crystal composition.

An object of one embodiment of the present invention is to provide a highly reliable liquid crystal display device with low power consumption and high display quality by using the liquid crystal element.

One embodiment of the present invention is a liquid crystal composition exhibiting a blue phase and containing nematic liquid crystal, 1,4:3,6-dianhydro-2,5-bis[4-(n-hexyl-1-oxy)benzoic acid] sorbitol (abbreviation: ISO-(6OBA)$_2$) represented by the structural formula (100) as a first chiral agent, and (4R,5R)-4,5-bis[hydroxy-di(phenanthren-9-yl)methyl]-2,2-dimethyl-1,3-dioxolane (abbreviation: R-DOL-Pn) represented by the structural formula (101) as a second chiral agent.

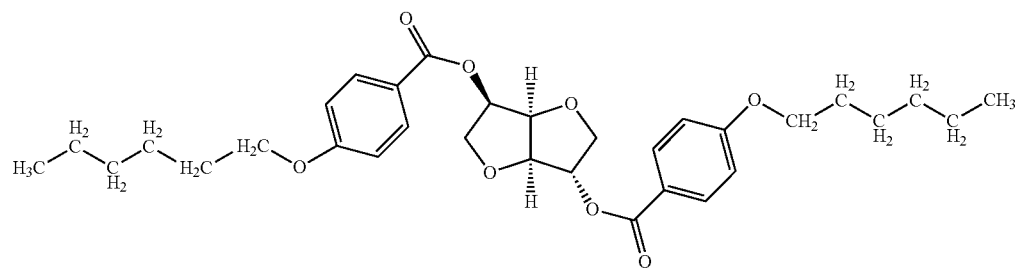

(100)

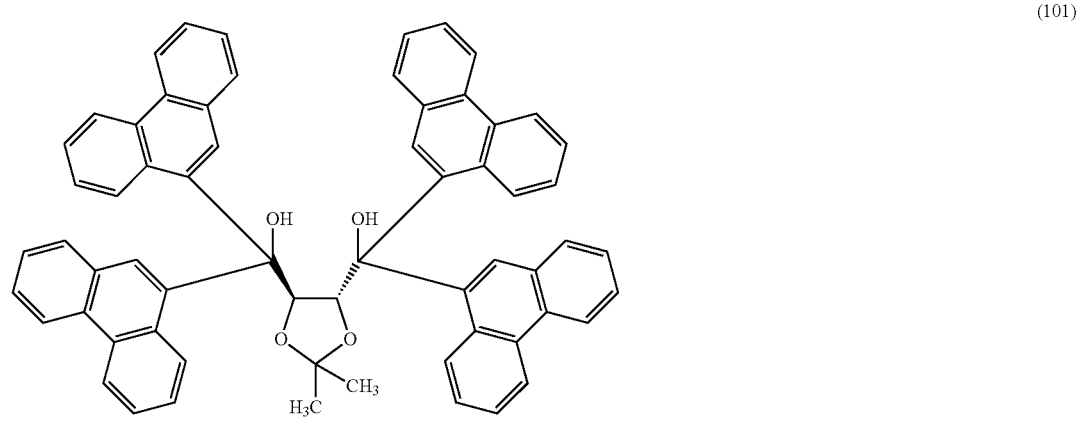

(101)

A blue phase appears in a liquid crystal composition having strong twisting power and a double twist structure. The liquid crystal composition shows a cholesteric phase, a cholesteric blue phase, an isotropic phase, or the like depending on conditions.

A cholesteric blue phase which is a blue phase includes three structures of blue phase I, blue phase II, and blue phase III from the low temperature side. A cholesteric blue phase is optically isotropic, and blue phase I and blue phase II have body-centered cubic symmetry and simple cubic symmetry, respectively. In the cases of blue phase I and blue phase II, Bragg diffraction is seen in the range from ultraviolet light to visible light.

As the indicators of the strength of twisting power, the helical pitch, the selective reflection wavelength, helical twisting power (HTP), and the diffracted wavelength are given. A liquid crystal composition having high helical twisting power (HTP) means that the twisting power of the liquid crystal composition is strong.

When the twisting power of the liquid crystal composition is strong, the transmittance of the liquid crystal composition in application of no voltage (at an applied voltage of 0 V) can be low, leading to a higher contrast of a liquid crystal display device including the liquid crystal composition.

The chiral agent is used to induce twisting of the liquid crystal composition, align the liquid crystal composition in a helical structure, and make the liquid crystal composition exhibit a blue phase. For the chiral agent, a compound which has an asymmetric center, high compatibility with the liquid crystal composition, and strong twisting power is used. In addition, the chiral agent is an optically active substance; a higher optical purity is better and the most preferable optical purity is 99% or higher.

Since R-DOL-Pn is a chiral agent with a strong twisting power, the proportion of the chiral agent in a liquid crystal composition can be reduced. When a large amount of chiral agent is added to improve the twisting power of the liquid crystal composition, driving voltage applied to drive the liquid crystal composition might increase. As in the liquid crystal composition, reduction in the amount of chiral agent to be added allows decrease in driving voltage, resulting in low power consumption.

A liquid crystal element including a liquid crystal composition containing ISO-$(6OBA)_2$ as a chiral agent can be highly resistant to pressing force and voltage and can stably keep a state where a blue phase appears. For example, the liquid crystal element can withstand physical impact and keep a state where a blue phase appears even under a high pressure.

A liquid crystal element which includes a liquid crystal composition containing ISO-$(6OBA)_2$ which contributes to stability and R-DOL-Pn which contributes to high twisting power as chiral agents can have high reliability and low power consumption.

One embodiment of the present invention is a liquid crystal composition having a helical twisting power of 80 $\mu m^{-1}$ or higher.

One embodiment of the present invention is a liquid crystal composition containing a polymerizable monomer and a polymerization initiator.

One embodiment of the present invention is a liquid crystal composition in which the temperature range within which a blue phase appears is higher than 3.9° C. and lower than 5.1° C.

One embodiment of the present invention is a liquid crystal element which keeps a state where a blue phase appears under a pressing force of 3 N.

One embodiment of the present invention is a liquid crystal element, a liquid crystal display device, or an electronic apparatus each of which includes the above liquid crystal composition.

According to one embodiment of the present invention, a novel liquid crystal composition exhibiting a blue phase and containing nematic liquid crystal, ISO-$(6OBA)_2$ as the first chiral agent, and R-DOL-Pn as the second chiral agent can be provided.

According to one embodiment of the present invention, a liquid crystal element or liquid crystal display device with low driving voltage and high stability can be provided with the use of the liquid crystal composition. Therefore, a highly reliable liquid crystal display device with low power consumption and high display quality can be provided. Furthermore, a highly reliable liquid crystal element, liquid crystal display device, and/or electronic device with low driving voltage and low power consumption can be provided.

BRIEF DESCRIPTION OF THE DRAWINGS

In the accompanying drawings:

FIGS. 4A1, 4A2, and 4B illustrate liquid crystal display modules;

DETAILED DESCRIPTION OF THE INVENTION

Figure 1:
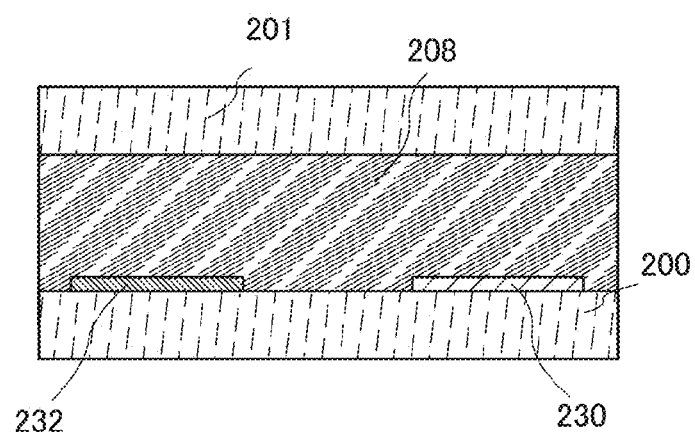
FIG. 1 is a conceptual view illustrating a liquid crystal composition.

Embodiments and Examples of the present invention will be described in detail with reference to the accompanying drawings. Note that the present invention is not limited to the following description, and it will be easily understood by those skilled in the art that modes and details can be modified in various ways without departing from the spirit and scope of the present invention. Therefore, the present invention should not be construed as being limited to the description in the following embodiments and examples. In the structures described below, the same portions or portions having similar functions are denoted by the same reference numerals in different drawings, and explanation thereof will not be repeated.

Note that the ordinal numbers such as "first", "second", and "third" in this specification are used for convenience and do not denote the order of steps and the stacking order of layers. In addition, the ordinal numbers in this specification do not denote particular names which specify the present invention.

Embodiment 1

A liquid crystal composition according to one embodiment of the present invention, a liquid crystal element including the liquid crystal composition, and a liquid crystal display device including the liquid crystal composition will be described with reference to FIG. 1. FIG. 1 is a cross-sectional view of a liquid crystal element and a liquid crystal display device.

A liquid crystal composition according to one embodiment of the present invention is a liquid crystal composition exhibiting a blue phase and containing nematic liquid crystal, ISO-$(6OBA)_2$ represented by the structural formula (100) as the first chiral agent, and R-DOL-Pn represented by the structural formula (101) as the second chiral agent.

state where a blue phase appears. For example, the liquid crystal element can withstand physical impact and keep a state where a blue phase appears even under a high pressure.

A liquid crystal element which includes a liquid crystal composition containing ISO-$(6OBA)_2$ which contributes to stability and R-DOL-Pn which contributes to high twisting power as chiral agents can have high reliability and low power consumption.

The nematic liquid crystal is not particularly limited, and examples thereof are a biphenyl-based compound, a terphe-

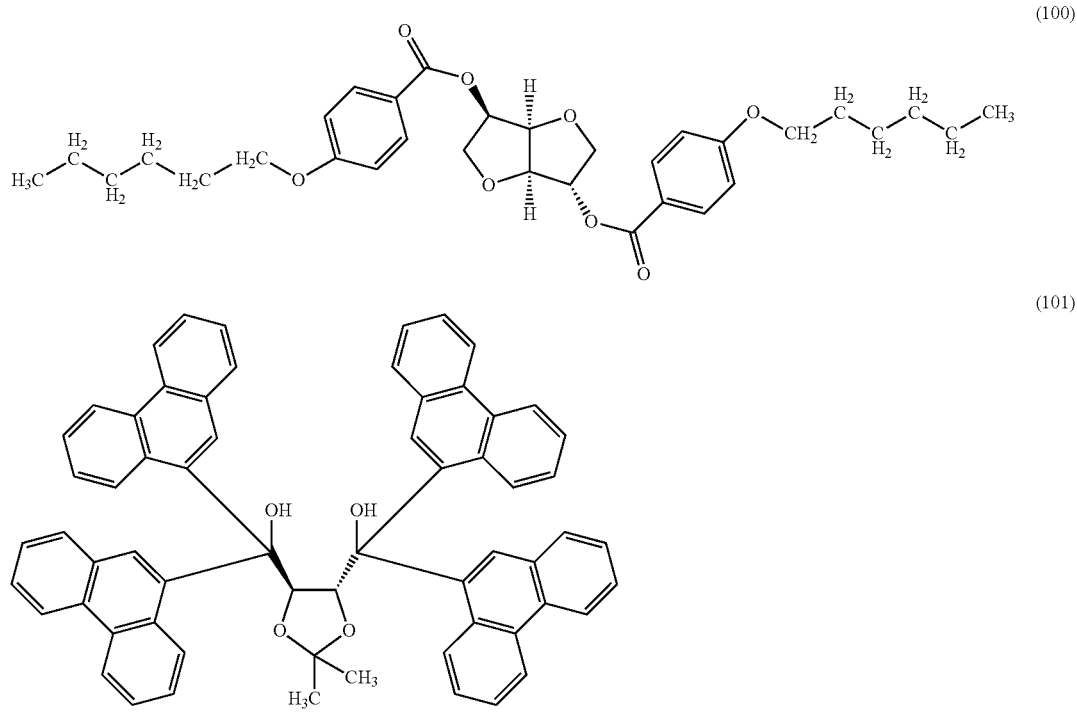 [SMILES: CCCCCCOc1ccc(C(=O)O[C@H]2CO[C@H]3[C@@H]2OC[C@H]3OC(=O)c2ccc(OCCCCCC)cc2)cc1 ; CC1(C)O[C@@H](C(O)(c2cc3ccccc3c3ccccc23)c2cc3ccccc3c3ccccc23)[C@H](C(O)(c2cc3ccccc3c3ccccc23)c2cc3ccccc3c3ccccc23)O1]

When the twisting power of the liquid crystal composition is strong, the transmittance of the liquid crystal composition in application of no voltage (at an applied voltage of 0 V) can be low, leading to a higher contrast of a liquid crystal display device including the liquid crystal composition.

The chiral agent is used to induce twisting of the liquid crystal composition, align the liquid crystal composition in a helical structure, and make the liquid crystal composition exhibit a blue phase. For the chiral agent, a compound which has an asymmetric center, high compatibility with the liquid crystal composition, and strong twisting power is used. In addition, the chiral agent is an optically active substance; a higher optical purity is better and the most preferable optical purity is 99% or higher.

Since R-DOL-Pn is a chiral agent with a strong twisting power, the proportion of the chiral agent in a liquid crystal composition can be reduced. When a large amount of chiral agent is added to improve the twisting power of the liquid crystal composition, driving voltage applied to drive the liquid crystal composition might increase. As in the liquid crystal composition, reduction in the amount of chiral agent to be added allows decrease in driving voltage, resulting in low power consumption.

A liquid crystal element including a liquid crystal composition containing ISO-$(6OBA)_2$ as a chiral agent can be highly resistant to pressing force and voltage and can stably keep a nyl-based compound, a phenylcyclohexyl-based compound, a biphenylcyclohexyl-based compound, a phenylbicyclohexyl-based compound, a benzoic acid phenyl-based compound, a cyclohexyl benzoic acid phenyl-based compound, a phenyl benzoic acid phenyl-based compound, a bicyclohexyl carboxylic acid phenyl-based compound, an azomethine-based compound, an azo-based compound, an azoxy-based compound, a stilbene-based compound, a bicyclohexyl-based compound, a phenylpyrimidine-based compound, a diphenylpyrimidine-based compound, a pyrimidine-based compound, and a biphenyl ethyne-based compound.

A blue phase is optically isotropic and thus has no viewing angle dependence. Consequently, an alignment film is not necessarily formed; therefore, display image quality can be improved and cost can be reduced.

In a liquid crystal display device, it is preferable that a polymerizable monomer be added to a liquid crystal composition and polymer stabilization treatment be performed in order to broaden the temperature range within which a blue phase appears. As the polymerizable monomer, for example, a thermopolymerizable (thermosetting) monomer which can be polymerized by heat, a photopolymerizable (photocurable) monomer which can be polymerized by light, or a polymerizable monomer which can be polymerized by heat and light can be used. Furthermore, a polymerization initiator may be added to the liquid crystal composition.

The polymerizable monomer may be a monofunctional monomer such as acrylate or methacrylate; a polyfunctional monomer such as diacrylate, triacrylate, dimethacrylate, or trimethacrylate; or a mixture thereof. Furthermore, the polymerizable monomer may have liquid crystallinity, non-liquid crystallinity, or both of them.

As the polymerization initiator, a radical polymerization initiator which generates radicals by light irradiation, an acid generator which generates an acid by light irradiation, or a base generator which generates a base by light irradiation may be used.

For example, polymer stabilization treatment can be performed in such a manner that a photopolymerizable monomer and a photopolymerization initiator are added to the liquid crystal composition and the liquid crystal composition is irradiated with light having a wavelength at which the photopolymerizable monomer and the photopolymerization initiator react with each other. As the photopolymerizable monomer, typically, a UV polymerizable monomer can be used. When a UV-polymerizable monomer is used as the photopolymerizable monomer, the liquid crystal composition may be irradiated with ultraviolet light.

This polymer stabilization treatment may be performed on a liquid crystal composition exhibiting an isotropic phase or a liquid crystal composition exhibiting a blue phase under the control of the temperature. Note that a temperature at which the phase changes from a blue phase to an isotropic phase when the temperature rises, or a temperature at which the phase changes from an isotropic phase to a blue phase when the temperature falls is referred to as phase transition temperature between a blue phase and an isotropic phase. For example, the polymer stabilization treatment can be performed in the following manner: after a liquid crystal composition to which a photopolymerizable monomer is added is heated to exhibit an isotropic phase, the temperature of the liquid crystal composition is gradually lowered so that the phase changes to a blue phase, and then, light irradiation is performed while the temperature at which a blue phase appears is kept.

FIG. 1 illustrates an example of a liquid crystal element and a liquid crystal display device according to one embodiment of the present invention.

A liquid crystal element according to one embodiment of the present invention at least includes, between a pair of electrode layers (a pixel electrode layer 230 and a common electrode layer 232 which have different potentials), a liquid crystal composition 208 exhibiting a blue phase and containing nematic liquid crystal, ISO-(6OBA)$_2$ as the first chiral agent, and R-DOL-Pn as the second chiral agent.

FIG. 1 illustrates a liquid crystal display device in which a first substrate 200 and a second substrate 201 are provided to face each other, and between the substrates, the liquid crystal composition 208 containing nematic liquid crystal, ISO-(6OBA)$_2$ as the first chiral agent, and R-DOL-Pn as the second chiral agent is provided.

In the liquid crystal element and the liquid crystal display device illustrated in FIG. 1, the pixel electrode layer 230 and the common electrode layer 232 are adjacently provided between the first substrate 200 and the liquid crystal composition 208. With the structure in FIG. 1, a method in which the gray scale is controlled by generating an electric field substantially parallel (i.e., in the lateral direction) to a substrate to move liquid crystal molecules in a plane parallel to the substrate can be used.

Such a structure illustrated in FIG. 1 is suitable for the case where the liquid crystal composition exhibiting a blue phase and containing nematic liquid crystal, ISO-(6OBA)$_2$ as the first chiral agent, and R-DOL-Pn as the second chiral agent, which is a liquid crystal composition according to one embodiment of the present invention, is used as the liquid crystal composition 208. The liquid crystal composition provided as the liquid crystal composition 208 may contain an organic resin.

With an electric field generated between the pixel electrode layer 230 and the common electrode layer 232, liquid crystal is controlled. An electric field in the lateral direction is applied to the liquid crystal, so that liquid crystal molecules can be controlled by the electric field. The liquid crystal composition exhibiting a blue phase is capable of quick response. Thus, a high-performance liquid crystal element and a high-performance liquid crystal display device can be achieved.

For example, such a liquid crystal composition exhibiting a blue phase, which is capable of quick response, can be favorably used for a successive additive color mixing method (field sequential method) in which light-emitting diodes (LEDs) of RGB or the like are arranged in a backlight unit and color display is performed by time division, or a three-dimensional display method using a shutter glasses system in which images for the right eye and images for the left eye are alternately viewed by time division.

The distance between the pixel electrode layer 230 and the common electrode layer 232, which are adjacent to each other with the liquid crystal composition 208 interposed therebetween, is a distance at which liquid crystal in the liquid crystal composition 208 between the pixel electrode layer 230 and the common electrode layer 232 responds to predetermined voltages applied to the pixel electrode layer 230 and the common electrode layer 232. The voltage applied is controlled depending on the distance as appropriate.

The maximum thickness (film thickness) of the liquid crystal composition 208 is preferably greater than or equal to 1 μm and less than or equal to 20 μm.

The liquid crystal composition 208 can be formed by a dispensing method (dropping method), or an injection method in which liquid crystal is injected using capillary action or the like after the first substrate 200 and the second substrate 201 are attached to each other.

Although not illustrated in FIG. 1, an optical film such as a polarizing plate, a retardation plate, or an anti-reflection film, and the like are provided as appropriate. For example, circular polarization with the polarizing plate and the retardation plate may be used. In addition, a backlight or the like can be used as a light source.

In this specification, a substrate provided with a semiconductor element (e.g., a transistor) or a pixel electrode layer is referred to as an element substrate (a first substrate), and a substrate which faces the element substrate with a liquid crystal composition interposed therebetween is referred to as a counter substrate (a second substrate).

As a liquid crystal display device according to one embodiment of the present invention, a transmissive liquid crystal display device in which display is performed by transmission of light from a light source, a reflective liquid crystal display device in which display is performed by reflection of incident light, or a transflective liquid crystal display device in which a transmissive type and a reflective type are combined can be provided.

In the case of the transmissive liquid crystal display device, a pixel electrode layer, a common electrode layer, a first substrate, a second substrate, and other components such as an insulating film and a conductive film, which are provided in a pixel region through which light is transmitted, have a property of transmitting light in the visible wavelength range.

In the liquid crystal display device having the structure illustrated in FIG. 1, it is preferable that the pixel electrode layer and the common electrode layer have a light-transmitting property; however, if an opening pattern is provided, a non-light-transmitting material such as a metal film may be used depending on the shape.

On the other hand, in the case of the reflective liquid crystal display device, a reflective component (e.g., a reflective film or substrate) which reflects light transmitted through the liquid crystal composition may be provided on the side opposite to the viewing side of the liquid crystal composition. Therefore, a substrate, an insulating film, and a conductive film, which are provided between the viewing side and the reflective component and through which light is transmitted, have a light-transmitting property with respect to light in the visible wavelength range. Note that in this specification, a light-transmitting property refers to a property of transmitting at least light in the visible wavelength range.

The pixel electrode layer 230 and the common electrode layer 232 may be formed with the use of one or more of the following: indium tin oxide, a conductive material in which zinc oxide (ZnO) is mixed into indium oxide, a conductive material in which silicon oxide ($SiO_2$) is mixed into indium oxide, organoindium, organotin, indium oxide containing tungsten oxide, indium zinc oxide containing tungsten oxide, indium oxide containing titanium oxide, and indium tin oxide containing titanium oxide; graphene; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

As the first substrate 200 and the second substrate 201, a glass substrate of barium borosilicate glass, aluminoborosilicate glass, or the like, a quartz substrate, a plastic substrate, or the like can be used. Note that in the case of the reflective liquid crystal display device, a metal substrate such as an aluminum substrate or a stainless steel substrate may be used as a substrate on the side opposite to the viewing side.

Thus, a liquid crystal composition exhibiting a blue phase and containing nematic liquid crystal, ISO-$(6OBA)_2$ as the first chiral agent, and R-DOL-Pn as the second chiral agent can be provided.

A liquid crystal element or liquid crystal display device with low driving voltage and high stability can be provided with the use of the liquid crystal composition. Therefore, a highly reliable liquid crystal display device with low power consumption can be provided.

This embodiment can be implemented in appropriate combination with any of the structures described in the other embodiments.

Embodiment 2

As a liquid crystal display device according to one embodiment of the present invention, a passive matrix liquid crystal display device and an active matrix liquid crystal display device can be provided. In this embodiment, an example of an active matrix liquid crystal display device according to one embodiment of the present invention will be described with reference to FIGS. 2A and 2B and FIGS. 3A to 3D.

Figure 2A:
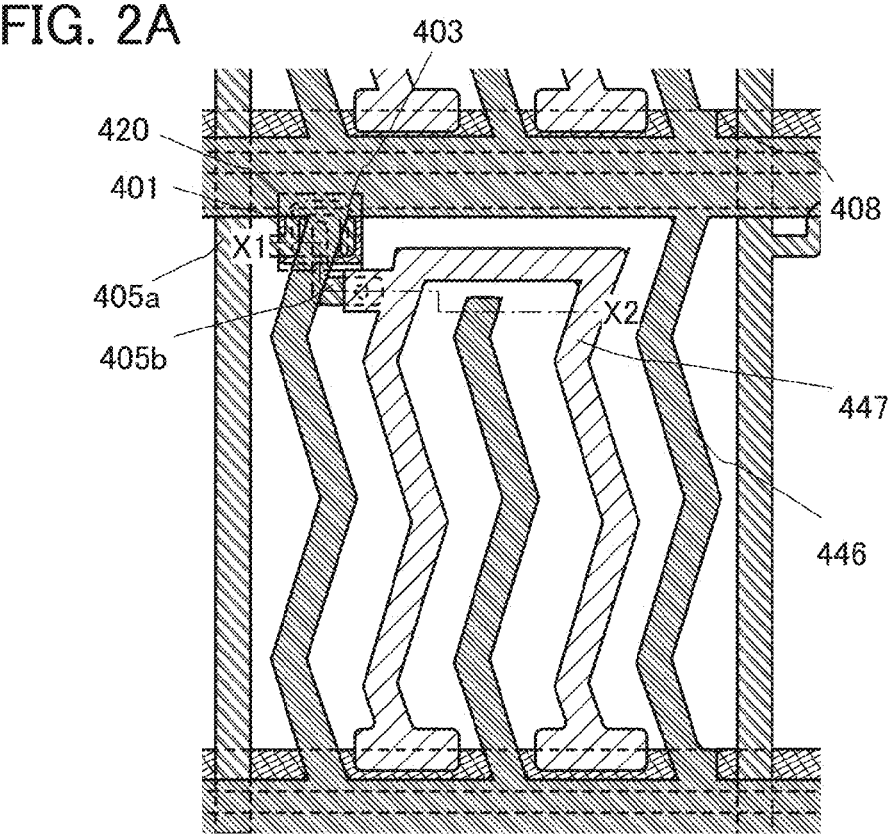
FIGS. 2A and 2B illustrate one mode of a liquid crystal display device.
Figure 2B:
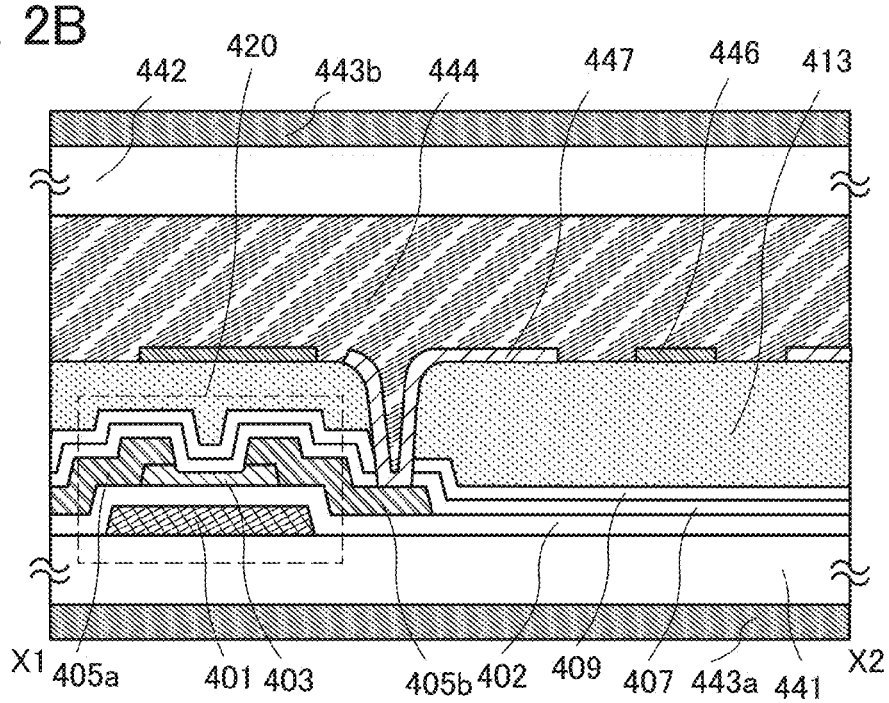

FIG. 2A is a plan view of the liquid crystal display device and illustrates one pixel. FIG. 2B is a cross-sectional view taken along the line X1-X2 in FIG. 2A.

In FIG. 2A, a plurality of source wiring layers (including a wiring layer 405a) is arranged so as to be parallel to (extended in the longitudinal direction in the drawing) and apart from each other. A plurality of gate wiring layers (including a gate electrode layer 401) is arranged so as to be extended in the direction perpendicular to or substantially perpendicular to the source wiring layers (in the horizontal direction in the drawing) and apart from each other. Common wiring layers 408 are provided so as to be adjacent to the respective gate wiring layers and extended in the direction parallel to or substantially parallel to the gate wiring layers, that is, in the direction perpendicular to or substantially perpendicular to the source wiring layers (in the horizontal direction in the drawing). A roughly rectangular space is surrounded by the source wiring layers, the common wiring layer 408, and the gate wiring layer. In this space, a pixel electrode layer and a common electrode layer of the liquid crystal display device are provided. A transistor 420 for driving the pixel electrode layer is provided at the upper left corner of the drawing. A plurality of pixel electrode layers and a plurality of transistors are arranged in a matrix.

In the liquid crystal display device in FIGS. 2A and 2B, a first electrode layer 447 electrically connected to the transistor 420 serves as a pixel electrode layer, while a second electrode layer 446 electrically connected to the common wiring layer 408 serves as a common electrode layer. Note that a capacitor is formed by the first electrode layer and the common wiring layer. Although the common electrode layer can operate in a floating state (electrically isolated state), the potential of the common electrode layer may be set to a fixed potential, preferably to a potential around an intermediate potential of an image signal which is transmitted as data at such a level as not to generate flickers.

A method can be used in which the gray scale is controlled by generating an electric field parallel to or substantially parallel to a substrate (i.e., in the lateral direction) to move liquid crystal molecules in a plane parallel to the substrate. For such a method, an electrode structure used in an IPS mode illustrated in FIGS. 2A and 2B and FIGS. 3A to 3D can be employed.

In a lateral electric field mode such as an IPS mode, a first electrode layer (e.g., a pixel electrode layer with which a voltage is controlled in each pixel) and a second electrode layer (e.g., a common electrode layer with which a common voltage is applied to all pixels), each of which has an opening pattern, are located below a liquid crystal composition. Therefore, the first electrode layer 447 and the second electrode layer 446, one of which serves as a pixel electrode layer and the other of which serves as a common electrode layer, are formed over a first substrate 441, and at least one of the first electrode layer and the second electrode layer is formed over an insulating film. The first electrode layer 447 and the second electrode layer 446 are not flat but have various opening patterns including a bent portion or a branched comb-like portion. The first electrode layer 447 and the second electrode layer 446 need to avoid having the same shape or completely overlapping with each other in order to generate an electric field between the electrodes.

The first electrode layer 447 and the second electrode layer 446 may have an electrode structure used in an FFS mode. In a lateral electric field mode such as an FFS mode, a first electrode layer (e.g., a pixel electrode layer with which a voltage is controlled in each pixel) having an opening pattern is located below a liquid crystal composition, and further, a second electrode layer (e.g., a common electrode layer with which a common voltage is applied to all pixels) having a flat shape is located below the opening pattern. In this case, the first electrode layer and the second electrode layer, one of which is a pixel electrode layer and the other of which is a common electrode layer, are formed over the first substrate 441, and the pixel electrode layer and the common electrode layer are stacked with an insulating film (or an interlayer insulating film) interposed therebetween. One of the pixel electrode layer and the common electrode layer is formed below the insulating film (or the interlayer insulating film), whereas the other is formed above the insulating film (or the interlayer insulating film) and has various opening patterns including a bent portion or a branched comb-like portion. The first electrode layer 447 and the second electrode layer 446 need to avoid having the same shape or completely overlapping with each other in order to generate an electric field between the electrodes.

As the liquid crystal composition 444, a liquid crystal composition exhibiting a blue phase and containing the nematic liquid crystal described in Embodiment 1, ISO-(6OBA)$_2$ as the first chiral agent, and R-DOL-Pn as the second chiral agent is used. The liquid crystal composition 444 may further contain an organic resin. In this embodiment, the liquid crystal composition 444 is subjected to polymer stabilization treatment, and is provided in a liquid crystal display device with a blue phase exhibited (in a state where a blue phase appears).

With an electric field generated between the first electrode layer 447 as the pixel electrode layer and the second electrode layer 446 as the common electrode layer, liquid crystal of the liquid crystal composition 444 is controlled. An electric field in the lateral direction is generated in the liquid crystal, so that liquid crystal molecules can be controlled using the electric field. Since the liquid crystal molecules aligned to exhibit a blue phase can be controlled in the direction parallel to the substrate, a wide viewing angle is obtained.

Figure 3A:
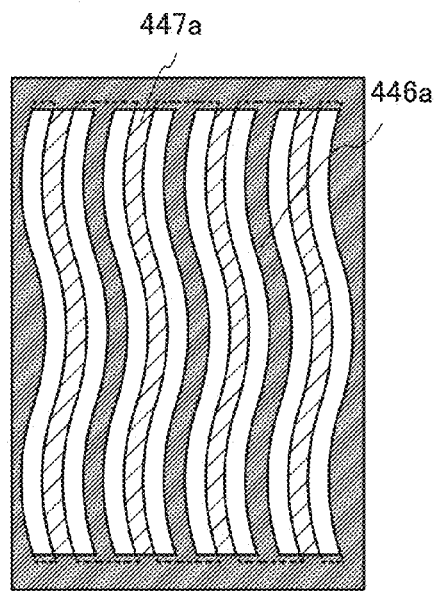
FIGS. 3A to 3D each illustrate one mode of the electrode structure of a liquid crystal display device.
Figure 3B:
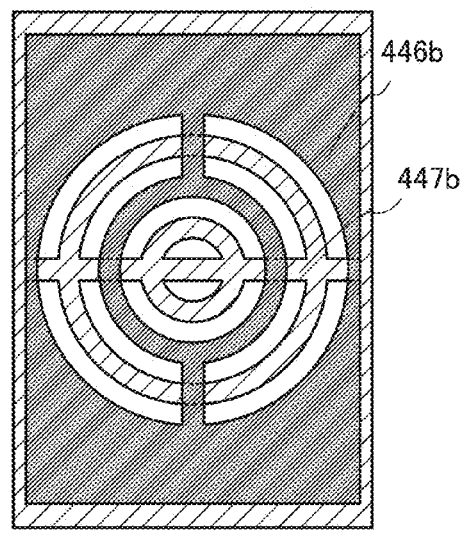
Figure 3C:
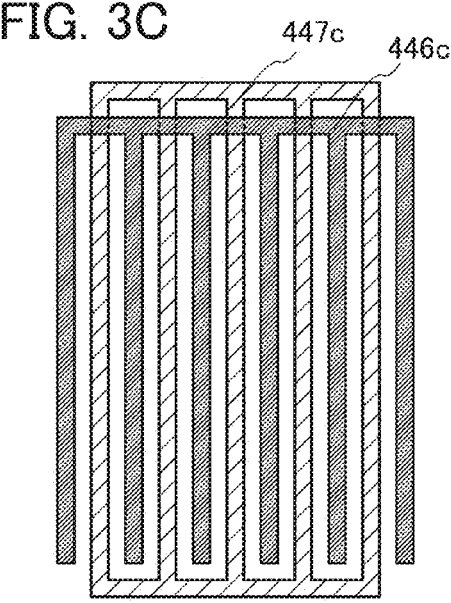
Figure 3D:
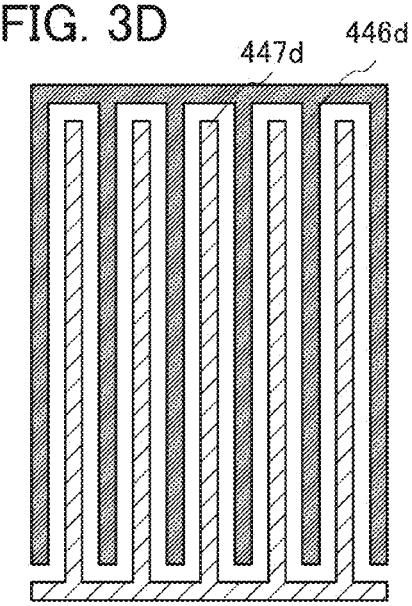

FIGS. 3A to 3D illustrate other examples of the first electrode layer 447 and the second electrode layer 446. As illustrated in top views of FIGS. 3A to 3D, first electrode layers 447a to 447d and second electrode layers 446a to 446d are arranged alternately. In FIG. 3A, the first electrode layer 447a and the second electrode layer 446a have an undulating wave shape. In FIG. 3B, the first electrode layer 447b and the second electrode layer 446b have shapes with concentric openings. In FIG. 3C, the first electrode layer 447c and the second electrode layer 446c have comb-like shapes and partially overlap with each other. In FIG. 3D, the first electrode layer 447d and the second electrode layer 446d have comb-like shapes in which the electrode layers engage with each other. In the case where the first electrode layers 447a, 447b, and 447c overlap with the second electrode layers 446a, 446b, and 446c, respectively, as illustrated in FIGS. 3A to 3C, an insulating film is formed between the first electrode layer 447 and the second electrode layer 446 so that the first electrode layer 447 and the second electrode layer 446 are formed over different films.

Since the first electrode layer 447 and the second electrode layer 446 have opening patterns, they are illustrated as divided plural electrode layers in the cross-sectional view in FIG. 2B. The same applies to the other drawings of this specification.

The transistor 420 is an inverted staggered thin film transistor in which the gate electrode layer 401, a gate insulating layer 402, a semiconductor layer 403, and wiring layers 405a and 405b which function as a source electrode layer and a drain electrode layer are formed over the first substrate 441 having an insulating surface.

There is no particular limitation on the structure of a transistor which can be used for a liquid crystal display device disclosed in this specification. For example, a staggered type or a planar type having a top-gate structure or a bottom-gate structure can be employed. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel region with a gate insulating layer interposed therebetween.

An insulating film 407 which is in contact with the semiconductor layer 403, and an insulating film 409 are provided to cover the transistor 420. An interlayer film 413 is stacked over the insulating film 409.

There is no particular limitation on the method for forming the interlayer film 413, and the following method can be employed depending on the material: spin coating, dip coating, spray coating, a droplet discharging method (an ink-jet method), screen printing, offset printing, roll coating, curtain coating, knife coating, or the like.

The first substrate 441 and a second substrate 442 which is a counter substrate are firmly attached to each other with a sealant with the liquid crystal composition 444 interposed therebetween. The liquid crystal composition 444 can be formed by a dispensing method (a dropping method), or an injection method by which liquid crystal is injected using capillary action or the like after the first substrate 441 is attached to the second substrate 442.

As the sealant, typically, a visible light curable resin, a UV curable resin, or a thermosetting resin is preferably used. Typically, an acrylic resin, an epoxy resin, an amine resin, or the like can be used. Furthermore, a photopolymerization initiator (typically, a UV polymerization initiator), a thermosetting agent, a filler, or a coupling agent may be contained in the sealant.

In the case where a liquid crystal composition containing a photopolymerization initiator, a polymerizable monomer, nematic liquid crystal, ISO-(6OBA)$_2$ as the first chiral agent, and R-DOL-Pn as the second chiral agent is used as the liquid crystal composition 444, polymer stabilization treatment can be performed by light irradiation.

After the space between the first substrate 441 and the second substrate 442 is filled with the liquid crystal composition, polymer stabilization treatment is performed by light irradiation, whereby the liquid crystal composition 444 is formed. The light has a wavelength at which the polymerizable monomer and the photopolymerization initiator which are used for the liquid crystal composition 444 react. By such polymer stabilization treatment by light irradiation, the temperature range within which the liquid crystal composition 444 exhibits a blue phase can be broadened.

In the case where a photocurable resin such as a UV curable resin is used as a sealant and a liquid crystal composition is formed by a dropping method, for example, the sealant may be cured in the light irradiation step of the polymer stabilization treatment.

In this embodiment, a polarizing plate 443a is provided on the outer side (on the side opposite to the liquid crystal composition 444) of the first substrate 441, and a polarizing plate 443b is provided on the outer side (on the side opposite to the liquid crystal composition 444) of the second substrate 442. In addition to the polarizing plate, an optical film such as a retardation plate or an anti-reflection film may be provided. For example, circular polarization with the polarizing plate and the retardation plate may be used. Through the above process, a liquid crystal display device can be completed.

In the case of manufacturing a plurality of liquid crystal display devices using a large-sized substrate (a multiple panel method), a division step can be performed before the polymer stabilization treatment is performed or before the polarizing plates are provided. In consideration of the influence of the division step on the liquid crystal composition (such as alignment disorder due to force applied in the division step), it is preferable that the division step be performed after the attachment between the first substrate and the second substrate and before the polymer stabilization treatment.

Although not illustrated, a backlight, a sidelight, or the like may be used as a light source. Light from the light source is emitted from the side of the first substrate 441 which is an element substrate so as to pass through the second substrate 442 on the viewing side.

The first electrode layer 447 and the second electrode layer 446 can be formed with the use of a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or graphene.

The first electrode layer 447 and the second electrode layer 446 can be formed of one or more materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

The first electrode layer 447 and the second electrode layer 446 can be formed using a conductive composition including a conductive high molecule (also referred to as a conductive polymer). The pixel electrode formed using the conductive composition preferably has a sheet resistance of less than or equal to 10000 ohms per square and a transmittance of greater than or equal to 70% at a wavelength of 550 nm. Furthermore, the resistivity of the conductive high molecule included in the conductive composition is preferably less than or equal to 0.1 $\Omega \cdot \text{cm}$.

As the conductive high molecule, a $\pi$-electron conjugated conductive polymer can be used. Examples thereof include polyaniline or a derivative thereof, polypyrrole or a derivative thereof, polythiophene or a derivative thereof, a copolymer of two or more kinds of aniline, pyrrole, and thiophene or a derivative thereof.

An insulating film serving as a base film may be provided between the first substrate 441 and the gate electrode layer 401. The base film has a function of preventing diffusion of an impurity element from the first substrate 441, and can be formed to have a single-layer structure or a layered structure using one or more of a silicon nitride film, a silicon oxide film, a silicon nitride oxide film, and a silicon oxynitride film. The gate electrode layer 401 can be formed to have a single-layer structure or a layered structure using any of metal materials such as molybdenum, titanium, chromium, tantalum, tungsten, aluminum, copper, neodymium, and scandium, and an alloy material which contains any of these materials as its main component. Alternatively, a semiconductor film typified by a polycrystalline silicon film doped with an impurity element such as phosphorus, or a silicide film such as a nickel silicide film may be used as the gate electrode layer 401. By using a light-blocking conductive film as the gate electrode layer 401, light from a backlight (light emitted through the first substrate 441) can be prevented from entering the semiconductor layer 403.

For example, as a two-layer structure of the gate electrode layer 401, the following structures are preferable: a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, and a two-layer structure in which a titanium nitride layer and a molybdenum layer are stacked. As a three-layer structure, a layered structure in which a tungsten layer or a tungsten nitride layer, an alloy layer of aluminum and silicon or an alloy layer of aluminum and titanium, and a titanium nitride layer or a titanium layer are stacked is preferable.

For example, the gate insulating layer 402 can be formed by a plasma CVD method or a sputtering method, with the use of a silicon oxide film, a gallium oxide film, an aluminum oxide film, a silicon nitride film, a silicon oxynitride film, an aluminum oxynitride film, or a silicon nitride oxide film. Alternatively, a high-k material such as hafnium oxide, yttrium oxide, lanthanum oxide, hafnium silicate ($HfSi_xO_y$, ($x>0$, $y>0$)), hafnium aluminate ($HfAl_xO_y$, ($x>0$, $y>0$)), hafnium silicate to which nitrogen is added, or hafnium aluminate to which nitrogen is added may be used as a material for the gate insulating layer 402. The use of such a high-k material enables a reduction in gate leakage current.

Alternatively, the gate insulating layer 402 can be a silicon oxide layer formed by a CVD method using an organosilane gas. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), or trisdimethylaminosilane ($SiH(N(CH_3)_2)_3$) can be used. Note that the gate insulating layer 402 may have a single layer structure or a layered structure.

A material of the semiconductor layer 403 is not particularly limited and may be determined as appropriate depending on characteristics needed for the transistor 420. Examples of a material which can be used for the semiconductor layer 403 will be described.

The semiconductor layer 403 can be formed using the following material: an amorphous semiconductor formed by a chemical vapor deposition method using a semiconductor source gas typified by silane or germane or by a physical vapor deposition method such as sputtering; a polycrystalline semiconductor formed by crystallizing the amorphous semiconductor with the use of light energy or thermal energy; a microcrystalline semiconductor in which a minute crystalline phase and an amorphous phase coexist; or the like. The semiconductor layer can be formed by a sputtering method, an LPCVD method, a plasma CVD method, or the like.

A typical example of an amorphous semiconductor is hydrogenated amorphous silicon, while a typical example of a crystalline semiconductor is polysilicon. Examples of polysilicon (polycrystalline silicon) are as follows: high-temperature polysilicon which contains polysilicon formed at a process temperature of 800° C. or higher as its main component, low-temperature polysilicon which contains polysilicon formed at a process temperature of 600° C. or lower as its main component, and polysilicon obtained by crystallizing amorphous silicon with the use of an element that promotes crystallization, or the like. It is needless to say that a microcrystalline semiconductor or a semiconductor partly containing a crystal phase can be used as described above.

Alternatively, an oxide semiconductor may be used. In that case, any of the following can be used: indium oxide; tin oxide; zinc oxide; a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a three-component metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; and a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide. In addition, any of the above oxide semiconductors may contain an element other than In, Ga, Sn, and Zn, for example, $SiO_2$.

Here, for example, the In—Ga—Zn-based oxide semiconductor refers to an oxide semiconductor containing indium (In), gallium (Ga), and zinc (Zn) and there is no particular limitation on the composition ratio thereof.

For the oxide semiconductor layer, a thin film expressed by the chemical formula, $InMO_3(ZnO)_3(ZnO)_m$ (m>0), can be used. Here, M represents one or more metal elements selected from Ga, Al, Mn, and Co. For example, M can be Ga, Ga and Al, Ga and Mn, or Ga and Co.

In the case where the In—Sn—Zn—O-based material is used as the oxide semiconductor, the atomic ratio of metal elements in a target may be In:Sn:Zn=1:2:2, 2:1:3, or 1:1:1, for example.

In the case where an In—Zn—O-based material is used as the oxide semiconductor, the atomic ratio is set so that In/Zn is in a range from 0.5 to 50, preferably from 1 to 20, more preferably from 1.5 to 15. When the atomic ratio of Zn is in the above-described range, a transistor can be improved in field-effect mobility. Here, when the atomic ratio of the compound is In:Zn:O=X: Y:Z, the relation Z>1.5X+Y is satisfied.

For the oxide semiconductor layer, a crystalline oxide semiconductor which is not completely single crystal nor completely amorphous and has c-axis orientation (also referred to as c-axis aligned crystalline oxide semiconductor (CAAC-OS)) can be used.

In a process of forming the semiconductor layer and the wiring layer, an etching step is used to process thin films into desired shapes. Dry etching or wet etching can be employed for the etching step.

The etching conditions (such as an etchant, etching time, and temperature) are appropriately adjusted depending on the material so that the material can be etched to have a desired shape.

As a material of the wiring layers 405a and 405b serving as source and drain electrode layers, an element selected from Al, Cr, Ta, Ti, Mo, and W; an alloy containing any of the above elements as its component; an alloy film containing a combination of any of these elements; and the like are given. Furthermore, in the case where heat treatment is performed, the conductive film preferably has heat resistance against the heat treatment. Since the use of aluminum alone brings disadvantages such as low heat resistance and a tendency to corrosion, aluminum is used in combination with a conductive material having heat resistance. As the conductive material having heat resistance, which is combined with aluminum, it is possible to use an element selected from titanium (Ti), tantalum (Ta), tungsten (W), molybdenum (Mo), chromium (Cr), neodymium (Nd), and scandium (Sc); an alloy containing any of these elements as its component; an alloy containing a combination of any of these elements; or a nitride containing any of these elements as its component.

The gate insulating layer 402, the semiconductor layer 403, and the wiring layers 405a and 405b serving as source and drain electrode layers may be successively formed without being exposed to the air. Successive film formation without exposure to the air makes it possible to obtain each interface between stacked layers, which is not contaminated by atmospheric components or impurity elements in the air. Therefore, variation in characteristics of the transistor can be reduced.

Note that the semiconductor layer 403 is partly etched so as to have a groove (a depressed portion).

As the insulating film 407 and the insulating film 409 which cover the transistor 420, an inorganic insulating film or an organic insulating film formed by a dry method or a wet method can be used. For example, it is possible to use a silicon nitride film, a silicon oxide film, a silicon oxynitride film, an aluminum oxide film, or a tantalum oxide film, which is formed by a CVD method, a sputtering method, or the like. Alternatively, an organic material such as polyimide, acrylic, a benzocyclobutene-based resin, polyamide, or epoxy can be used. As an alternative to such organic materials, it is possible to use a low-dielectric constant material (a low-k material), a siloxane-based resin, phosphosilicate glass (PSG), borophosphosilicate glass (BPSG), or the like. A gallium oxide film can also be used as the insulating film 407.

Note that the siloxane-based resin corresponds to a resin including a Si—O—Si bond formed using a siloxane-based material as a starting material. The siloxane-based resin may include as a substituent an organic group (e.g., an alkyl group or an aryl group) or a fluoro group. The organic group may include a fluoro group. A siloxane-based resin is applied by a coating method and baked; thus, the insulating film 407 can be formed.

Alternatively, the insulating film 407 and the insulating film 409 may be formed by stacking a plurality of insulating films formed using any of these materials. For example, a structure may be employed in which an organic resin film is stacked over an inorganic insulating film.

Furthermore, with the use of a resist mask having regions with plural thicknesses (typically, two different thicknesses) which is formed using a multi-tone mask, the number of photomasks can be reduced, resulting in a simplified process and lower cost.

As described above, with the use of the liquid crystal composition exhibiting a blue phase and containing nematic liquid crystal, ISO-(6OBA)$_2$ as the first chiral agent, and R-DOL-Pn as the second chiral agent, a liquid crystal element or liquid crystal display device with low driving voltage and high stability can be provided. Therefore, a highly reliable liquid crystal display device with low power consumption can be provided.

Since the liquid crystal composition exhibiting a blue phase and containing nematic liquid crystal, ISO-(6OBA)$_2$ as the first chiral agent, and R-DOL-Pn as the second chiral agent is capable of quick response, a high-performance liquid crystal display device can be achieved.

This embodiment can be implemented in appropriate combination with any of the structures described in the other embodiments.

Embodiment 3

A liquid crystal display device having a display function can be manufactured by manufacturing transistors and using the transistors for a pixel portion and further for a driver circuit. Furthermore, part or the whole of the driver circuit can be formed over the same substrate as the pixel portion, using the transistor, whereby a system-on-panel can be obtained.

The liquid crystal display device includes a liquid crystal element (also referred to as a liquid crystal display element) as a display element.

Furthermore, a liquid crystal display device includes a panel in which a liquid crystal display element is sealed, and a module in which an IC or the like including a controller is mounted on the panel. One embodiment of the present invention also relates to an element substrate, which corresponds to one mode in which the display element has not been completed in a process for manufacturing the liquid crystal display device, and the element substrate is provided with a means for supplying current to the display element in each of a plurality of pixels. Specifically, the element substrate may be in a state where it is provided only with a pixel electrode of the display element, in a state where a conductive film to be a pixel electrode has been formed and the conductive film has not yet been etched to form the pixel electrode, or in any other state.

Note that a liquid crystal display device in this specification means an image display device, a display device, or a light source (including a lighting device). Furthermore, the liquid crystal display device includes any of the following modules in its category: a module to which a connector such as a flexible printed circuit (FPC), tape automated bonding (TAB) tape, or a tape carrier package (TCP) is attached; a module having TAB tape or a TCP which is provided with a printed wiring board at the end thereof; and a module having an integrated circuit (IC) directly mounted on a display element by a chip on glass (COG) method.

The appearance and a cross section of a liquid crystal display panel, which is one embodiment of a liquid crystal display device, will be described with reference to FIGS. 4A1, 4A2, and 4B. FIGS. 4A1 and 4A2 are each a top view of a panel in which transistors 4010 and 4011 formed over a first substrate 4001 and a liquid crystal element 4013 are sealed between the first substrate 4001 and a second substrate 4006 with a sealant 4005. FIG. 4B is a cross-sectional view taken along the line M-N of FIGS. 4A1 and 4A2.

The sealant 4005 is provided to surround a pixel portion 4002 and a scan line driver circuit 4004 that are provided over the first substrate 4001. The second substrate 4006 is provided over the pixel portion 4002 and the scan line driver circuit 4004. Therefore, the pixel portion 4002 and the scan line driver circuit 4004 are sealed together with a liquid crystal composition 4008, by the first substrate 4001, the sealant 4005, and the second substrate 4006.

In FIG. 4A1, a signal line driver circuit 4003 that is formed using a single crystal semiconductor film or a polycrystalline semiconductor film over a substrate separately prepared is mounted in a region different from the region surrounded by the sealant 4005 over the first substrate 4001. Note that FIG. 4A2 illustrates an example in which part of the signal line driver circuit is formed using a transistor provided over the first substrate 4001. A signal line driver circuit 4003b is formed over the first substrate 4001, and a signal line driver circuit 4003a formed using a single crystal semiconductor film or a polycrystalline semiconductor film is mounted on a substrate separately prepared.

Note that there is no particular limitation on the connection method of a driver circuit which is separately formed, and COG, wire bonding, TAB, or the like can be used. FIG. 4A1 illustrates an example of mounting the signal line driver circuit 4003 by COG, and FIG. 4A2 illustrates an example of mounting the signal line driver circuit 4003 by TAB.

The pixel portion 4002 and the scan line driver circuit 4004 provided over the first substrate 4001 each include a plurality of transistors. FIG. 4B illustrates the transistor 4010 included in the pixel portion 4002 and the transistor 4011 included in the scan line driver circuit 4004. An insulating layer 4020 and an interlayer film 4021 are provided over the transistors 4010 and 4011.

As the transistors 4010 and 4011, the transistor which is described in Embodiment 2 or 3 can be employed.

Furthermore, a conductive layer may be provided over the interlayer film 4021 or the insulating layer 4020 so as to overlap with a channel formation region of a semiconductor layer of the transistor 4011 for the driver circuit. The conductive layer may have a potential the same as or different from that of a gate electrode layer of the transistor 4011 and can function as a second gate electrode layer. Furthermore, the potential of the conductive layer may be GND or the conductive layer may be in a floating state.

A pixel electrode layer 4030 and a common electrode layer 4031 are provided over the interlayer film 4021, and the pixel electrode layer 4030 is electrically connected to the transistor 4010. The liquid crystal element 4013 includes the pixel electrode layer 4030, the common electrode layer 4031, and the liquid crystal composition 4008. Note that a polarizing plate 4032a and a polarizing plate 4032b are provided on the outer sides of the first substrate 4001 and the second substrate 4006, respectively.

As the liquid crystal composition 4008, a liquid crystal composition exhibiting a blue phase and containing the nematic liquid crystal described in Embodiment 1, ISO-(6OBA)$_2$ as the first chiral agent, and R-DOL-Pn as the second chiral agent is used. The structures of the pixel electrode layer and the common electrode layer described in Embodiment 1 or 2 can be used for the pixel electrode layer 4030 and the common electrode layer 4031.

In this embodiment, as the liquid crystal composition 4008, a liquid crystal composition exhibiting a blue phase and containing the nematic liquid crystal, ISO-(6OBA)$_2$ as the first chiral agent, and R-DOL-Pn as the second chiral agent is used. The liquid crystal composition 4008 is subjected to polymer stabilization treatment, and is provided in a liquid crystal display device with a blue phase exhibited (in a state where a blue phase appears). Therefore, in this embodiment, the pixel electrode layer 4030 and the common electrode layer 4031 have opening patterns, as the electrode layers illustrated in FIG. 1 in Embodiment 1 or FIGS. 3A to 3D in Embodiment 2.

With an electric field generated between the pixel electrode layer 4030 and the common electrode layer 4031, liquid crystal of the liquid crystal composition 4008 is controlled. An electric field in the lateral direction is formed in the liquid crystal, so that liquid crystal molecules can be controlled using the electric field. Since the liquid crystal molecules aligned to exhibit a blue phase can be controlled in the direction parallel to the substrate, a wide viewing angle is obtained.

As the first substrate 4001 and the second substrate 4006, glass, plastic, or the like having a light-transmitting property can be used. As plastic, a polyvinyl fluoride (PVF) film, a polyester film, or an acrylic resin film can be used. A sheet with a structure in which an aluminum foil is sandwiched between PVF films or polyester films, or a fiberglass-reinforced plastics (FRP) plate can also be used.

A columnar spacer denoted by reference numeral 4035 is obtained by selective etching of an insulating film and is provided in order to control the thickness of the liquid crystal composition 4008 (a cell gap). Alternatively, a spherical spacer may be used. In the liquid crystal display device including the liquid crystal composition 4008, the cell gap which is the thickness of the liquid crystal composition is preferably greater than or equal to 1 µm and less than or equal to 20 µm. In this specification, the thickness of a cell gap refers to the maximum thickness (film thickness) of a liquid crystal composition.

Although FIGS. 4A1, 4A2, and 4B illustrate examples of transmissive liquid crystal display devices, one embodiment of the present invention can also be applied to a transflective liquid crystal display device and a reflective liquid crystal display device.

FIGS. 4A1, 4A2, and 4B illustrate examples of liquid crystal display devices in which a polarizing plate is provided on the outer side (the viewing side) of a substrate; however, the polarizing plate may be provided on the inner side of the substrate. The position of the polarizing plate may be determined as appropriate depending on the material of the polarizing plate and conditions of the manufacturing process. Furthermore, a light-blocking layer serving as a black matrix may be provided.

A color filter layer or a light-blocking layer may be formed as part of the interlayer film 4021. In FIGS. 4A1, 4A2, and 4B, a light-blocking layer 4034 is provided on the second substrate 4006 side so as to cover the transistors 4010 and 4011. By providing the light-blocking layer 4034, the contrast can be more increased and the transistors can be more stabilized.

The transistors may be, but is not necessarily, covered with the insulating layer 4020 which functions as a protective film of the transistors.

Note that the protective film is provided to prevent entry of contaminant impurities such as an organic substance, metal, and moisture in the air and is preferably a dense film. The protective film may be formed by a sputtering method to have a single-layer structure or a layered structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

Furthermore, in the case of further forming a light-transmitting insulating layer as a planarizing insulating film, the light-transmitting insulating layer can be formed using an organic material having heat resistance, such as polyimide, acrylic, a benzocyclobutene-based resin, polyamide, or epoxy. As an alternative to such organic materials, it is possible to use a low-dielectric constant material (a low-k material), a siloxane-based resin, phosphosilicate glass (PSG), borophosphosilicate glass (BPSG), or the like. The insulating layer may be formed by stacking a plurality of insulating films formed of these materials.

There is no particular limitation on the method for forming the insulating layer having a layered structure, and the following method can be employed depending on the material: sputtering, spin coating, dip coating, spray coating, a droplet discharging method (an ink-jet method), screen printing, offset printing, roll coating, curtain coating, knife coating, or the like.

The pixel electrode layer 4030 and the common electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or graphene.

Alternatively, the pixel electrode layer 4030 and the common electrode layer 4031 can be formed using one or more of the following: metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

The pixel electrode layer 4030 and the common electrode layer 4031 can be formed using a conductive composition including a conductive high molecule (also referred to as a conductive polymer).

Furthermore, a variety of signals and potentials are supplied to the signal line driver circuit 4003 which is formed separately, the scan line driver circuit 4004, or the pixel portion 4002 from an FPC 4018.

Furthermore, since the transistor is easily broken by static electricity or the like, a protective circuit for protecting the driver circuits is preferably provided over the same substrate as a gate line or a source line. The protection circuit is preferably formed using a nonlinear element.

In FIGS. 4A1, 4A2, and 4B, a connection terminal electrode 4015 is formed using the same conductive film as the pixel electrode layer 4030, and a terminal electrode 4016 is formed using the same conductive film as source electrode layers and drain electrode layers of the transistors 4010 and 4011.

The connection terminal electrode 4015 is electrically connected to a terminal of the FPC 4018 through an anisotropic conductive film 4019.

Although FIGS. 4A1, 4A2, and 4B illustrate examples in which the signal line driver circuit 4003 is formed separately and mounted on the first substrate 4001, one embodiment of the present invention is not limited to this structure. The scan line driver circuit may be separately formed and then mounted, or only part of the signal line driver circuit or part of the scan line driver circuit may be separately formed and then mounted.

As described above, with the use of the liquid crystal composition exhibiting a blue phase and containing nematic liquid crystal, ISO-(6OBA)$_2$ as the first chiral agent, and R-DOL-Pn as the second chiral agent, a liquid crystal element or liquid crystal display device with low driving voltage and high stability can be provided. Therefore, a highly reliable liquid crystal display device with low power consumption can be provided.

Since the liquid crystal composition exhibiting a blue phase and containing nematic liquid crystal, ISO-(6OBA)$_2$ as the first chiral agent, and R-DOL-Pn as the second chiral agent is capable of quick response, a high-performance liquid crystal display device can be achieved.

This embodiment can be implemented in appropriate combination with any of the structures described in the other embodiments.

Embodiment 4

A liquid crystal display device disclosed in this specification can be applied to a variety of electronic devices (including game machines). Examples of electronic devices are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a personal digital assistant, an audio reproducing device, a large-sized game machine such as a pachinko machine, and the like.

Figure 5A:
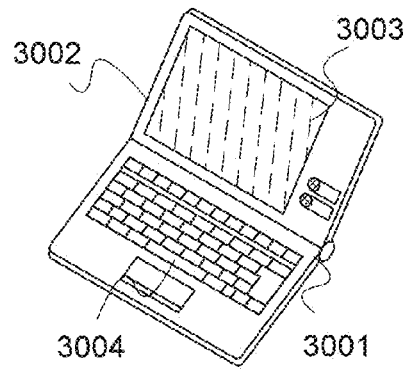
FIGS. 5A to 5F illustrate electronic devices.

FIG. 5A illustrates a laptop personal computer, which includes a main body 3001, a housing 3002, a display portion 3003, a keyboard 3004, and the like. The liquid crystal display device described in any of Embodiments 1 to 3 is used for the display portion 3003, whereby a highly reliable laptop personal computer with low power consumption can be provided.

Figure 5B:
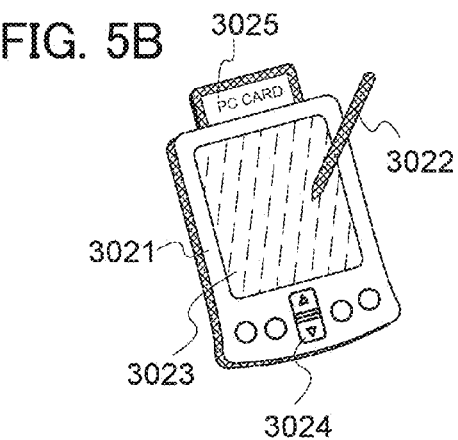

FIG. 5B illustrates a personal digital assistant (PDA), which includes a main body 3021 provided with a display portion 3023, an external interface 3025, operation buttons 3024, and the like. A stylus 3022 is provided as an accessory for operation. The liquid crystal display device described in any of Embodiments 1 to 3 is used for the display portion 3023, whereby a personal digital assistant (PDA) with low power consumption can be provided.

Figure 5C:
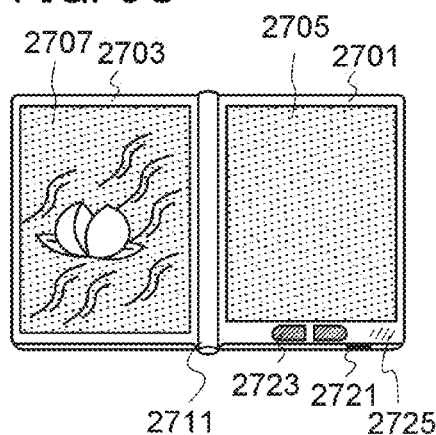

FIG. 5C illustrates an e-book reader, which includes two housings, a housing 2701 and a housing 2703. The housing 2701 and the housing 2703 are combined with a hinge 2711 so that the e-book reader can be opened and closed with the hinge 2711 as an axis. With such a structure, the e-book reader can be used like a paper book.

A display portion 2705 and a display portion 2707 are incorporated in the housing 2701 and the housing 2703, respectively. The display portion 2705 and the display portion 2707 may display one image or different images. In the structure where different images are displayed in the above display portions, for example, the right display portion (the display portion 2705 in FIG. 5C) can display text and the left display portion (the display portion 2707 in FIG. 5C) can display images. The liquid crystal display device described in any of Embodiments 1 to 3 is used for the display portions 2705 and 2707, whereby a highly reliable e-book reader with low power consumption can be provided. In the case of using a transflective or reflective liquid crystal display device as the display portion 2705, the e-book reader may be used in a comparatively bright environment; therefore, a solar cell may be provided so that power generation by the solar cell and charge by a battery can be performed. When a lithium ion battery is used as the battery, there are advantages of downsizing and the like.

FIG. 5C illustrates an example in which the housing 2701 is provided with an operation portion and the like. For example, the housing 2701 is provided with a power switch 2721, operation keys 2723, a speaker 2725, and the like. With the operation keys 2723, pages can be turned. Note that a keyboard, a pointing device, or the like may also be provided on the surface of the housing, on which the display portion is provided. Furthermore, an external connection terminal (an earphone terminal, a USB terminal, or the like), a recording medium insertion portion, and the like may be provided on the back surface or the side surface of the housing. Furthermore, the e-book reader may have a function of an electronic dictionary.

The e-book reader may transmit and receive data wirelessly. Through wireless communication, desired book data or the like can be purchased and downloaded from an electronic book server.

Figure 5D:
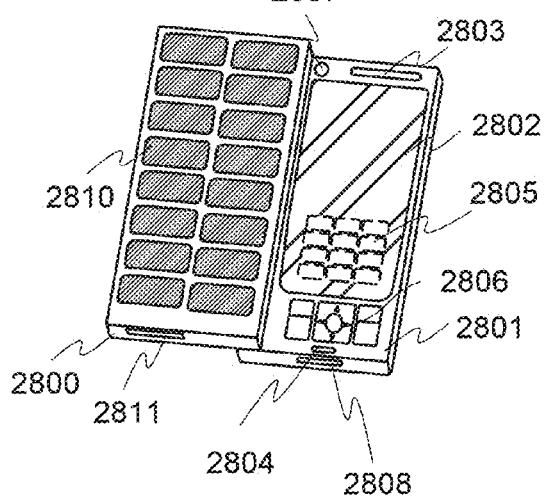

FIG. 5D illustrates a mobile phone, which includes two housings, a housing 2800 and a housing 2801. The housing 2801 includes a display panel 2802, a speaker 2803, a microphone 2804, a pointing device 2806, a camera lens 2807, an external connection terminal 2808, and the like. In addition, the housing 2800 includes a solar cell 2810 having a function of charge of the mobile phone, an external memory slot 2811, and the like. An antenna is incorporated in the housing 2801. The liquid crystal display device described in any of Embodiments 1 to 3 is used for the display panel 2802, whereby a highly reliable mobile phone with low power consumption can be provided.

Furthermore, the display panel 2802 is provided with a touch panel. A plurality of operation keys 2805 which is displayed as images is illustrated by dashed lines in FIG. 5D. Note that a boosting circuit by which a voltage output from the solar cell 2810 is increased to be sufficiently high for each circuit is also provided.

The display direction of the display panel 2802 is changed as appropriate depending on a usage pattern. Furthermore, the camera lens 2807 is provided on the same surface as the display panel 2802, so that the mobile phone can be used as a video phone. The speaker 2803 and the microphone 2804 can be used for videophone calls, recording and playing sound, and the like as well as voice calls. Furthermore, the housings 2800 and 2801 which are developed as illustrated in FIG. 5D can overlap with each other by sliding; thus, the size of the mobile phone can be decreased, which makes the mobile phone suitable for being carried.

The external connection terminal 2808 can be connected to an AC adapter and various types of cables such as a USB cable, and charging and data communication with a personal computer are possible. Moreover, a large amount of data can be stored and moved by inserting a storage medium into the external memory slot 2811.

Furthermore, in addition to the above functions, an infrared communication function, a television reception function, or the like may be provided.

Figure 5E:
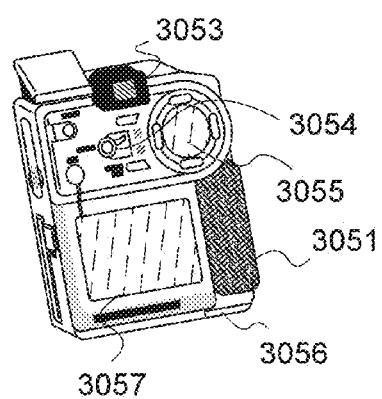

FIG. 5E illustrates a digital video camera, which includes a main body 3051, a display portion A 3057, an eyepiece portion 3053, an operation switch 3054, a display portion B 3055, a battery 3056, and the like. The liquid crystal display device described in any of Embodiments 1 to 3 is used for the display portion A 3057 and the display portion B 3055, whereby a highly reliable digital video camera with low power consumption can be provided.

Figure 5F:
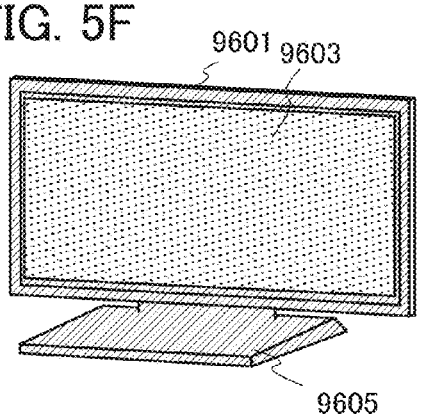

FIG. 5F illustrates a television set, which includes a housing 9601, a display portion 9603, and the like. The display portion 9603 can display images. Here, the housing 9601 is supported by a stand 9605. The liquid crystal display device described in any of Embodiments 1 to 3 is used for the display portion 9603, whereby a highly reliable television set with low power consumption can be provided.

The television set can operate with an operation switch of the housing 9601 or a separate remote controller. Furthermore, the remote controller may be provided with a display portion for displaying data output from the remote controller.

Note that the television set is provided with a receiver, a modem, and the like. With the use of the receiver, general television broadcasting can be received. Moreover, when the television set is connected to a communication network with or without wires via the modem, one-way (from a sender to a receiver) or two-way (between a sender and a receiver or between receivers) data communication can be performed.

This embodiment can be implemented in appropriate combination with any of the structures described in the other embodiments.

Example 1

In this example, liquid crystal compositions each according to one embodiment of the present invention were made, and the characteristics of the liquid crystal compositions were evaluated.

Table 1 shows components of liquid crystal compositions 1-1 to 1-7 made in this example. Note that in Table 1, the mixture ratios are all expressed in weight percent. The kinds and ratios of chiral agents are different between the liquid crystal compositions 1-1 to 1-7. Samples to which one embodiment of the present invention is applied are the liquid crystal compositions 1-2 to 1-6.

TABLE 1

| Name of material | | \multicolumn{7}{c}{Proportion in liquid crystal composition (wt %)} |
| --- | --- | --- | --- | --- | --- | --- | --- | --- |
| | | 1-1 | 1-2 | 1-3 | 1-4 | 1-5 | 1-6 | 1-7 |
| Liquid crystal 1 | E-8 | 40 | 99.90 | 99.75 | 99.80 | 99.80 | 99.80 | 99.80 | 99.90 |
| Liquid crystal 2 | CPP-3FF | 30 | | | | | | | |
| Liquid crystal 3 | PEP-5CNF | 30 | | | | | | | |
| First chiral agent | ISO-(6OBA)$_2$ | | 0.10 | 0.06 | 0.10 | 0.13 | 0.15 | 0.17 | 0.00 |
| Second chiral agent | R-DOL-Pn | | 0.00 | 0.19 | 0.10 | 0.07 | 0.05 | 0.03 | 0.10 |

In the liquid crystal compositions 1-1 to 1-7, liquid crystal mixture E-8 (produced by LCC Corporation) as liquid crystal 1,4-(trans-4-n-propylcyclohexyl)-3',4'-difluoro-1,1'-biphenyl (abbreviation: CPP-3FF) (produced by Daily Polymer Corporation) as liquid crystal 2, and 4-n-pentylbenzoic acid 4-cyano-3-fluorophenyl ester (abbreviation: PEP-5CNF) (produced by Daily Polymer Corporation) as liquid crystal 3 were used. The structural formulae of CPP-3FF (abbreviation) and PEP-5CNF (abbreviation) used in this example are shown below.

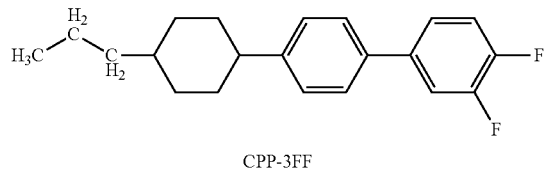

CPP-3FF

-continued

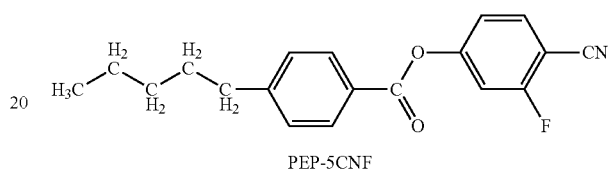

PEP-5CNF

In the liquid crystal compositions 1-1 to 1-7, ISO-(6OBA)$_2$ (abbreviation) (produced by Midori Kagaku Co., Ltd.) represented by the structural formula (100) and R-DOL-Pn (abbreviation) represented by the structural formula (101) were used as the first chiral agent and the second chiral agent, respectively.

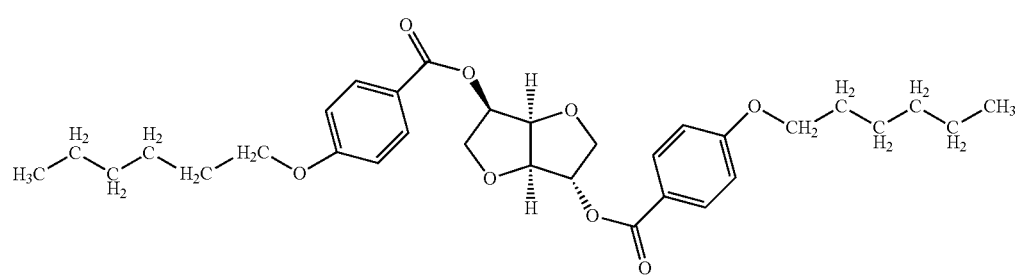

(100)

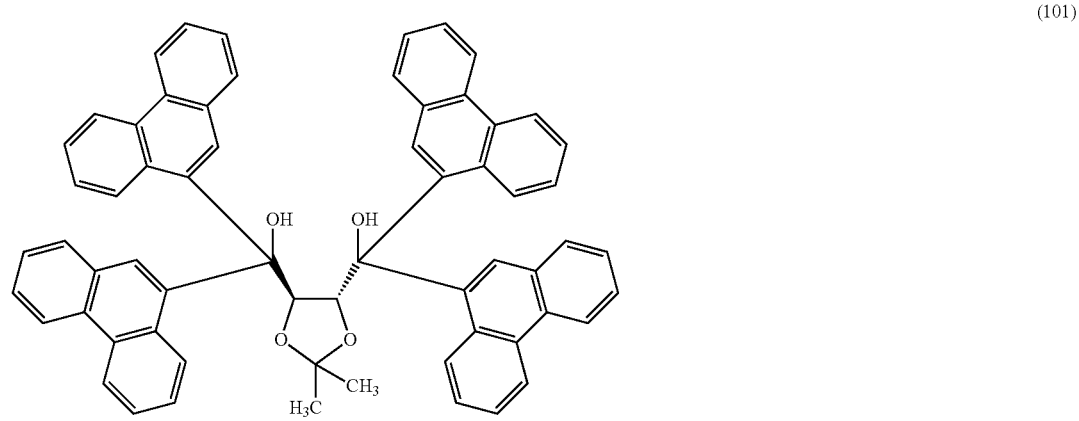

(101)

Figure 6:
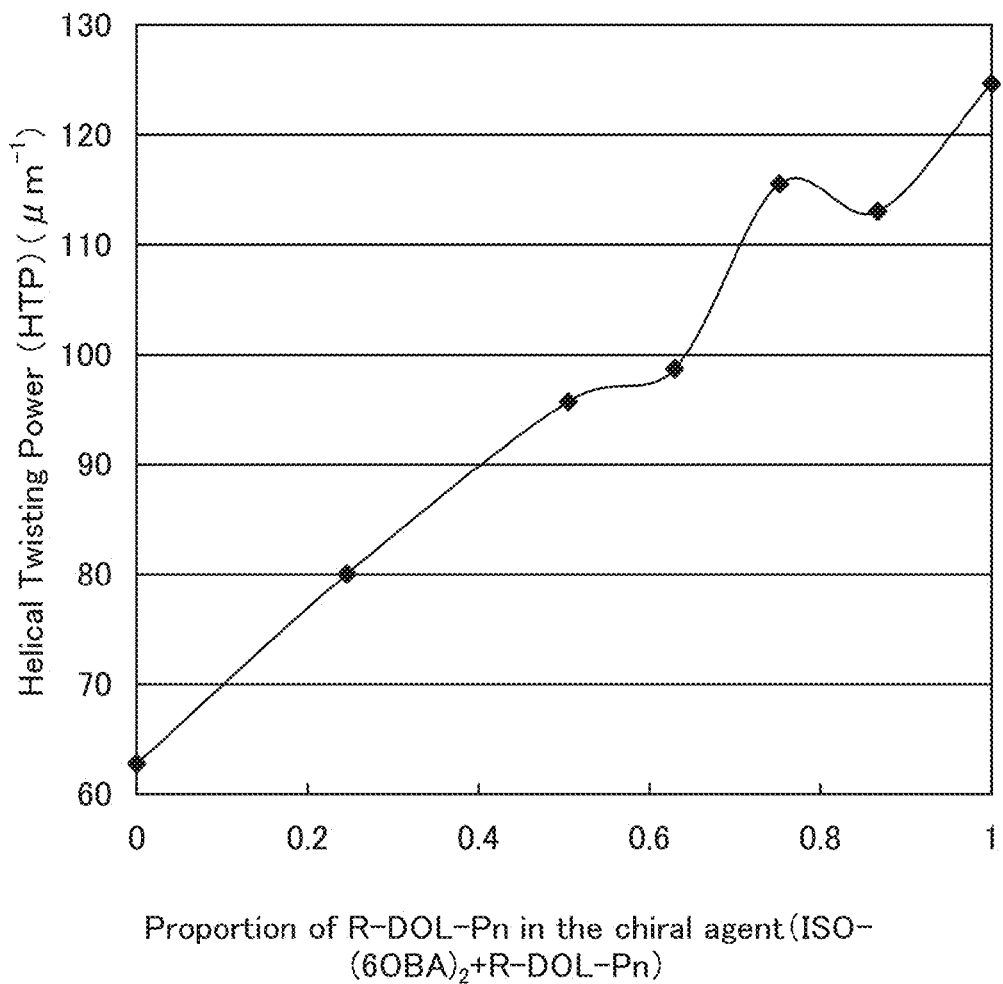
FIG. 6 is a graph showing the helical twisting power of a liquid crystal composition of Example 1.

The helical twisting power (HTP) of the liquid crystal compositions 1-1 to 1-7 was measured at room temperature by the Grandjean-Cano wedge cell method. FIG. 6 shows the measurement results. In FIG. 6, the horizontal axis indicates the proportion of the content (weight) of R-DOL-Pn, which is the second chiral agent in the chiral agents (the first chiral agent and the second chiral agent), and the vertical axis indicates the helical twisting power (HTP). The liquid crystal composition 1-1, for which only ISO-(6OBA)$_2$ was used, had a helical twisting power of about 63 $\mu m^{-1}$. As the proportion of the content in R-DOL-Pn increases, the helical twisting power also increases; a helical twisting power of 80 $\mu m^{-1}$, 110 $\mu m^{-1}$, or higher was observed.

Therefore, the liquid crystal composition to which one embodiment of the present invention is applied have a high twisting power, and a liquid crystal display device with higher contrast can be achieved with the use of the liquid crystal composition.

Example 2

In this example, liquid crystal compositions each according to one embodiment of the present invention, and liquid crystal elements including the liquid crystal compositions were made, and the temperature range within which a blue phase appears was measured.

Table 2 shows components of liquid crystal compositions 2-1 to 2-5 made in this example. Note that in Table 2, the mixture ratios are all expressed in weight percent. The kinds and ratios of chiral agents are different between the liquid crystal compositions 2-1 to 1-5. Samples to which one embodiment of the present invention is applied are the liquid crystal compositions 2-2 to 2-4.

TABLE 2

| | | Proportion in liquid crystal composition (wt %) | | | | | |
|---|---|---|---|---|---|---|---|
| Name of material | | 2-1 | 2-2 | 2-3 | 2-4 | 2-5 | |
| Liquid crystal 1 | E-8 | 40 | 92.50 | 93.88 | 94.60 | 95.52 | 96.00 | 91.7 |
| Liquid crystal 2 | CPP-3FF | 30 | | | | | |
| Liquid crystal 3 | PEP-5CNF | 30 | | | | | |
| First chiral agent | ISO-(6OBA)$_2$ | | 7.50 | 4.59 | 2.70 | 1.12 | 0.00 | |
| Second chiral agent | R-DOL-Pn | | 0.00 | 1.53 | 2.70 | 3.36 | 4.00 | |
| Polymerizable monomer | DMeAc | | | | | | | 4 |
| | RM257-O6 | | | | | | | 4 |
| Polymerization initiator | DMPAP | | | | | | | 0.3 |

The liquid crystal compositions 2-1 to 2-5 in this example are liquid crystal compositions to which a polymerizable monomer and a polymerization initiator are added in addition to the liquid crystal and chiral agents used for the liquid crystal compositions in Example 1. Note that, as in Example 1, liquid crystal 1 (E-8), liquid crystal 2 (CPP-3FF), and liquid crystal 3 (PEP-5CNF) were used for the liquid crystal; and the first chiral agent (ISO-(6OBA)$_2$) and the second chiral agent (R-DOL-Pn) were used for the chiral agents.

As the polymerizable monomers, 1,4-bis-[4-(6-acryloyloxy-n-hexyl-1-oxy)benzoyloxy]-2-methylbenzene (abbreviation: RM257-O6) (produced by SYNTHON Chemicals GmbH & Co. KG) and n-dodecyl methacrylate (abbreviation: DMeAc) (produced by Tokyo Chemical Industry Co., Ltd.) were used. As the polymerization initiator, 2,2-dimethoxy-2-phenylacetophenone (abbreviation: DMPAP) (produced by Tokyo Chemical Industry Co., Ltd.) was used.

The structural formulae of RM257-O6 (abbreviation), DMeAc (abbreviation), and DMPAP (abbreviation) used in this example are shown below.

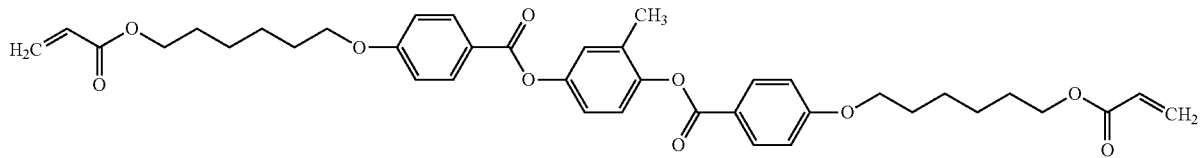

RM257-O6

-continued

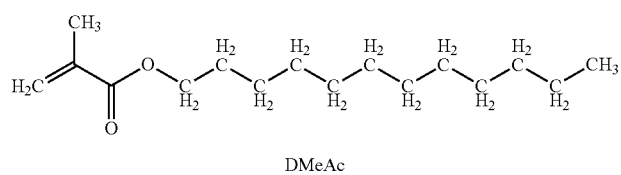
DMeAc

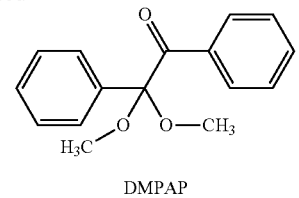
DMPAP

As shown in Table 2, in the liquid crystal compositions in which the polymerizable monomers (RM257-O6 and DMeAc) and the polymerization initiator (DMPAP) are added to the liquid crystal compositions 2-1 to 2-5, the proportion of each of the liquid crystal compositions 2-1 to 2-5 was 91.7 wt %, the proportion of RM257-O6 was 4 wt %, the proportion of DMeAc was 4 wt %, and the proportion of DMPAP was 0.3 wt %.

The temperature range within which a blue phase appears in the liquid crystal compositions 2-1 to 2-5 was measured in a state where the liquid crystal compositions were included in the respective liquid crystal elements. The process of manufacturing the liquid crystal elements including the liquid crystal compositions 2-1 to 2-5 will be described below. The liquid crystal elements including the liquid crystal compositions 2-1 to 2-5 were each manufactured in the following manner. A glass substrate over which a pixel electrode layer and a common electrode layer were formed in comb-like shapes as in FIG. 3D and a glass substrate serving as a counter substrate were bonded to each other using sealant with a space (4 μm) provided therebetween. Then the liquid crystal compositions 2-1 to 2-5 obtained by mixing materials in Table 2 stirred in an isotropic phase at ratios shown in Table 2 were injected between the substrates by an injection method.

The pixel electrode layer and the common electrode layer were formed with indium tin oxide containing silicon oxide by a sputtering method. The pixel electrode layer and the common electrode layer each had a thickness of 110 nm and a width of 2 μm, and the distance between the pixel electrode layer and the common electrode layer was 2 μm. Furthermore, an ultraviolet light and heat curable sealant was used as the sealant. As curing treatment, ultraviolet irradiation was performed at an irradiance of 100 mW/cm$^2$ for 90 seconds, and then, heat treatment was performed at 120° C. for an hour.

First, the liquid crystal compositions 2-1 to 2-5 in the liquid crystal elements were made to exhibit an isotropic phase. Then, the liquid crystal elements were observed with a polarizing microscope while the temperature was decreased by 1.0° C. per minute with a temperature controller. In this manner, the temperature range within which the liquid crystal compositions 2-1 to 2-5 exhibit a blue phase was measured. For the measurement, a polarizing microscope (MX61L produced by Olympus Corporation) and a temperature controller (HCS302-MK1000 produced by Instec, Inc.) were used.

The measurement conditions of the observation were as follows. In the polarizing microscope, a measurement mode was a reflective mode; polarizers were in crossed nicols; and the magnification was 200 times.

Table 3 shows the measurement results of the temperature range within which a blue phase appears in the liquid crystal compositions 2-1 to 2-5.

TABLE 3

| Sample | Proportion (wt) of R-DOL-Pn in chiral agent (ISO-(6OBA)$_2$ + R-DOL-Pn) | Temperature at which a blue phase appears (° C.) | | |
|---|---|---|---|---|
| | | Upper limit | Lower limit | Temperature range |
| Liquid crystal composition 2-1 | 0 | 40.6 | 35.5 | 5.1 |
| Liquid crystal composition 2-2 | 0.25 | 42.4 | 37.6 | 4.8 |
| Liquid crystal composition 2-3 | 0.5 | 45.0 | 40.7 | 4.3 |
| Liquid crystal composition 2-4 | 0.75 | 46.0 | 41.9 | 4.1 |
| Liquid crystal composition 2-5 | 1 | 47.3 | 43.4 | 3.9 |

The temperatures at which the liquid crystal compositions exhibit a blue phase are as follows. As for the liquid crystal composition 2-1 for which only ISO-(6OBA)$_2$ was used as chiral agent, the upper limit was 40.6° C. and the lower limit was 35.5° C., i.e., the temperature range was 5.1° C. As for the liquid crystal composition 2-2 in which the proportion of the content of R-DOL-Pn was 0.25 (ISO-(6OBA)$_2$: R-DOL-Pn=1:1), the upper limit was 42.4° C. and the lower limit was 37.6° C., i.e., the temperature range was 4.8° C. As for the liquid crystal composition 2-3 in which the proportion of the content of R-DOL-Pn was 0.5 (ISO-(6OBA)$_2$: R-DOL-Pn=1:1), the upper limit was 45.0° C. and the lower limit was 40.7° C., i.e., the temperature range was 4.3° C. As for the liquid crystal composition 2-4 in which the proportion of the content of R-DOL-Pn was 0.75 (ISO-(6OBA)$_2$: R-DOL-Pn=1:1), the upper limit was 46.0° C. and the lower limit was 41.9° C., i.e., the temperature range was 4.1° C. As for the liquid crystal composition 2-5 for which only R-DOL-Pn was used as chiral agent, the upper limit was 47.3° C. and the lower limit was 43.4° C., i.e., the temperature range was 3.9° C.

Figure 7:
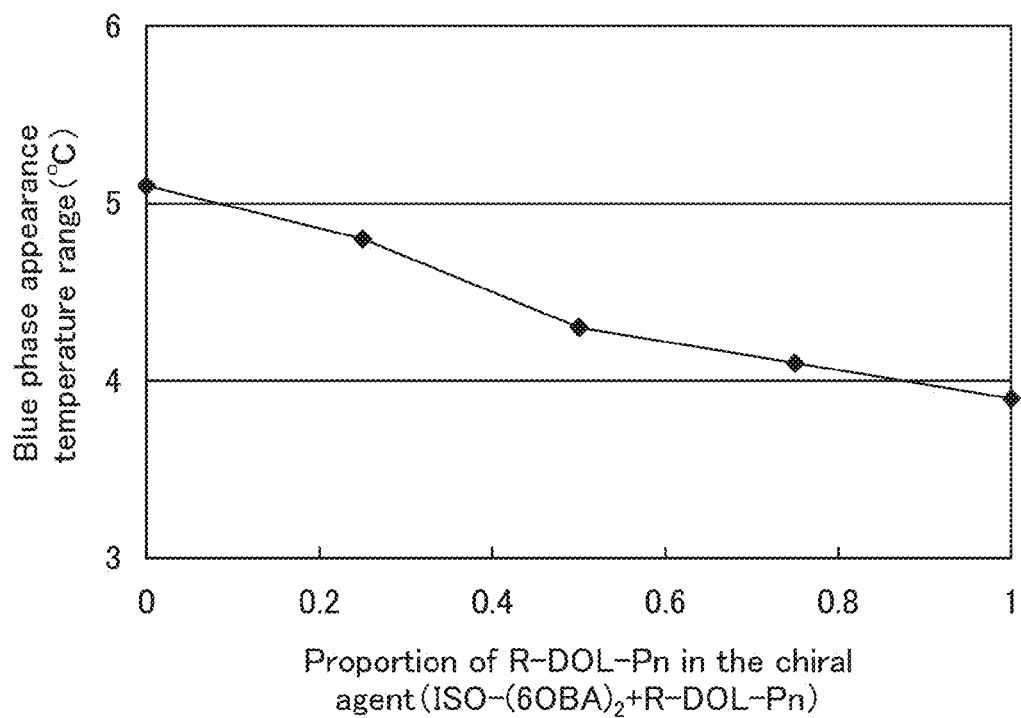
FIG. 7 is a graph showing the temperature range within which a blue phase appears in a liquid crystal composition of Example 2.

FIG. 7 shows the relations between the temperature range within which a blue phase appears and the proportion of the content (weight) of R-DOL-Pn, which is the second chiral agent in chiral agents (the first chiral agent and the second chiral agent). In FIG. 7, the horizontal axis indicates the proportion of the content (weight) of R-DOL-Pn, which is the second chiral agent, in chiral agents (the first chiral agent and the second chiral agent), and the vertical axis indicates the temperature range within which a blue phase appears.

The temperature range within which a blue phase appears in the liquid crystal composition 2-5, for which only R-DOL-Pn was used, was 3.9° C. As the proportion of the content of ISO-(6OBA)$_2$ increases, the temperature range within which a blue phase appears also increases to 4.1° C., 4.3° C., and 4.8° C.; thus, a wider temperature range within which a blue phase appears was observed.

Therefore, this example shows that the liquid crystal element including the novel liquid crystal composition described in this example, which is one embodiment of the present invention, has a wide temperature range within which a blue phase appears.

Example 3

In this example, liquid crystal compositions each according to one embodiment of the present invention, and liquid crystal elements including the liquid crystal compositions were made, and the characteristics of the liquid crystal compositions and the liquid crystal elements were evaluated by a pressing force endurance test.

Table 4 shows components of liquid crystal compositions 3-1 and 3-2 made in this example. Note that in Table 4, the mixture ratios are all expressed in weight percent. Note that the liquid crystal composition 3-1 is a comparative example, and a sample to which one embodiment of the present invention is applied is the liquid crystal composition 3-2.

TABLE 4

| Name of material | | | Proportion in liquid crystal composition (wt %) | | |
|---|---|---|---|---|---|
| | | | | 3-1 | 3-2 |
| Liquid crystal 1 | E-8 | 40 | 96.40 | 93.88 | 91.7 |
| Liquid crystal 2 | CPP-3FF | 30 | | | |
| Liquid crystal 3 | PEP-5CNF | 30 | | | |
| First chiral agent | ISO-(6OBA)$_2$ | | 0.00 | 4.59 | |
| Second chiral agent | R-DOL-Pn | | 3.90 | 1.53 | |
| Polymerizable monomer | DMeAc | | | | 4 |
| | RM257-O6 | | | | 4 |
| Polymerization initiator | DMPAP | | | | 0.3 |

The liquid crystal compositions 3-1 and 3-2 in this example are liquid crystal compositions to which a polymerizable monomer and a polymerization initiator are added in addition to the liquid crystal and chiral agents used for the liquid crystal compositions in Example 2. Note that, as in Example 2, liquid crystal 1 (E-8), liquid crystal 2 (CPP-3FF), and liquid crystal 3 (PEP-5CNF) were used for the liquid crystal; the first chiral agent (ISO-(6OBA)$_2$) and the second chiral agent (R-DOL-Pn) were used for the chiral agents; RM257-O6 and DMeAc were used for the polymerizable monomers; and DMPAP was used for the polymerization initiator.

Also in this example, liquid crystal elements were made with the use of the liquid crystal compositions 3-1 and 3-2 as in Example 2, and each of the liquid crystal elements was subjected to a pressing force endurance test. The manufacturing method is described below.

The liquid crystal elements including the liquid crystal compositions 3-1 and 3-2 were each manufactured in such a manner that a glass substrate (thickness: 0.7 mm) over which a pixel electrode layer and a common electrode layer were formed in comb-like shapes as in FIG. 3D and a glass substrate (thickness: 0.7 mm) serving as a counter substrate were bonded to each other using sealant with a space (4 μm) provided therebetween and then the liquid crystal compositions 3-1 and 3-2 obtained by mixing materials in Table 4 stirred in an isotropic phase at ratios shown in Table 4 was injected between the substrates by an injection method.

The pixel electrode layer and the common electrode layer were formed with indium tin oxide containing silicon oxide by a sputtering method. The pixel electrode layer and the common electrode layer each had a thickness of 110 nm and a width of 2 μm, and the distance between the pixel electrode layer and the common electrode layer was 2 μm. Furthermore, an ultraviolet light and heat curable sealant was used as the sealant. As curing treatment, ultraviolet irradiation was performed at an irradiance of 100 mW/cm$^2$ for 90 seconds, and then, heat treatment was performed at 120° C. for an hour.

The liquid crystal element including the liquid crystal composition 3-1 and the liquid crystal element including the liquid crystal composition 3-2 were subjected to polymer stabilization treatment in the following manner. The temperature was set to be constant in the range of the minimum temperature at which a blue phase appears to a temperature 3° C. higher than the maximum temperature at which a blue phase appears (the maximum temperature+3° C.), and the liquid crystal element were irradiated with UV light (light source: handy UV lamp, wavelength: 365 nm, irradiance: 0.5 mW/cm$^2$) for 30 minutes. Note that an optical filter (LU0350, produced by Asahi Spectra Co., Ltd) which blocks a wavelength of 350 nm or lower was provided between the light source and the liquid crystal element to adjust UV light from the light source, with which the liquid crystal element is irradiated. By the polymer stabilization treatment, polymerizable monomers contained in the liquid crystal composition 3-1 and the liquid crystal composition 3-2 are polymerized, so that the liquid crystal element including the liquid crystal composition 3-1 and the liquid crystal element including the liquid crystal composition 3-2 is a liquid crystal element including a liquid crystal composition containing an organic resin.

By this polymer stabilization treatment, the liquid crystal composition 3-1 and the liquid crystal composition 3-2 were cured (fixed) in a state of exhibiting a blue phase; thus, the liquid crystal element including the liquid crystal composition 3-1 and the liquid crystal element including the liquid crystal composition 3-2 were liquid crystal elements which keep a state where a blue phase appears.

Next, a pressing force endurance test was performed on the liquid crystal element including the liquid crystal composition 3-1 and the liquid crystal element including the liquid crystal composition 3-2, which keep a state where a blue phase appears. The pressing force endurance test was performed with a compact table-top universal tester (produced by SHIMADZU CORPORATION) under a force of 3 N for about three seconds. In the pressing force endurance test, force was applied to the liquid crystal element by pressing a curved surface of a hemisphere having a diameter of 0.5 mm on a substrate of the liquid crystal element.

Figure 8A:
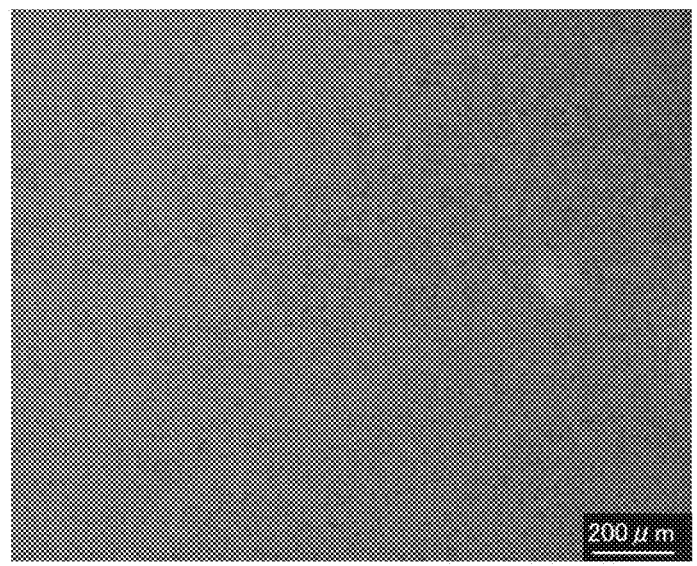
FIGS. 8A and 8B are optical images showing the results of a pressing force endurance test performed on a liquid crystal element 3-1 of Example 3.
Figure 8B:
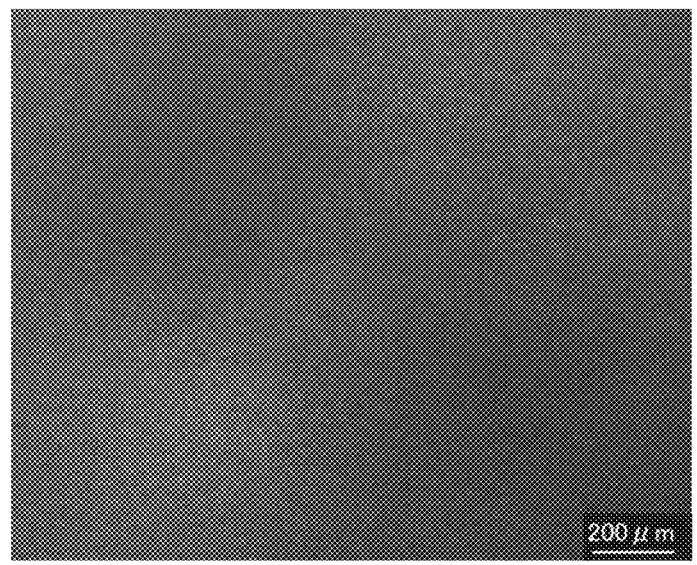
Figure 9A:
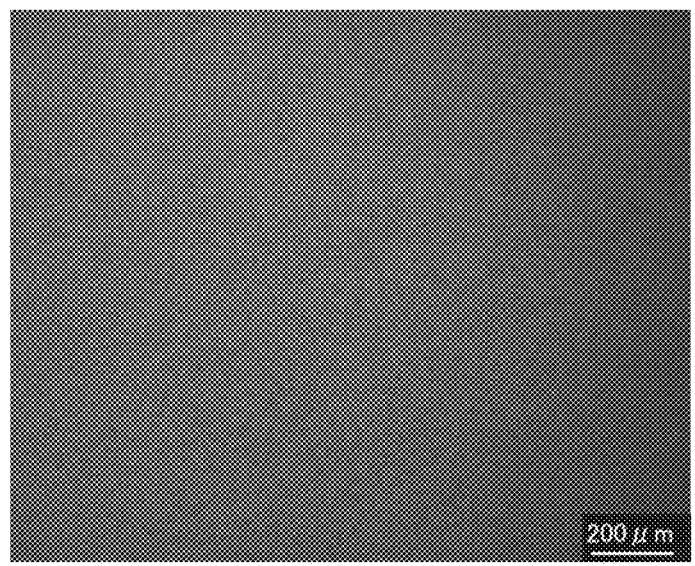
FIGS. 9A and 9B are optical images showing the results of a pressing force endurance test performed on a liquid crystal element 3-2 of Example 3.
Figure 9B:
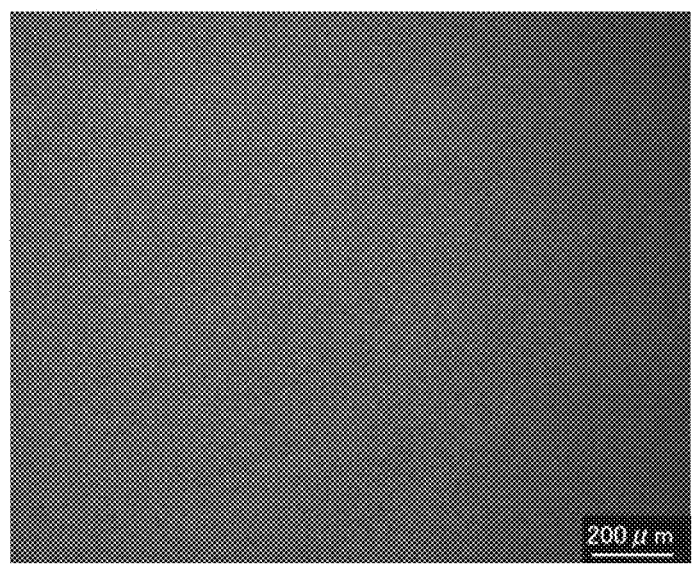

FIGS. 8A and 8B and FIGS. 9A and 9B show the results of the pressing force endurance test. FIG. 8A is an optical micrograph of the liquid crystal element including the liquid crystal composition 3-1 before the test, and FIG. 8B is the one after the test. FIG. 9A is an optical micrograph of the liquid crystal element including the liquid crystal composition 3-2 to which one embodiment of the present invention is applied before the test, and FIG. 9B is the one after the test. The observation was performed with an optical microscope (MX50 produced by Olympus Corporation) under the conditions that the light exposure time was 300 ms and the magnification was 50 times.

As shown in FIG. 8B, a blue phase appearing in the liquid crystal element including the liquid crystal composition 3-1, for which only R-DOL-Pn was used, was broken by the force. On the other hand, a blue phase appearing in the liquid crystal element including the liquid crystal composition 3-2 to which one embodiment of the present invention is applied and which contains a mixture of ISO-(6OBA)$_2$ and R-DOL-Pn was not broken by the force, as shown in FIG. 9B. After the test, the blue phase kept appearing.

Furthermore, in the liquid crystal element including the liquid crystal composition 3-2, a blue phase kept appearing after the pressing force endurance test under a force of 5 N, and further 10 N for about three seconds.

This example shows that the liquid crystal element including the liquid crystal composition to which one embodiment of the present invention is applied can be highly resistant to pressing force and can stably keep a state where a blue phase appears. Therefore, with the use of such a liquid crystal element, a highly reliable liquid crystal display device that withstands physical impact can be provided.

Example 4

This example shows an example of synthesizing (4R,5R)-4,5-bis[hydroxy-di(phenanthren-9-yl)methyl]-2,2-dimethyl-1,3-dioxolane (abbreviation: R-DOL-Pn) represented by the structural formula (101) in Examples 1 to 3.

<Synthesis Method of (4R,5R)-4,5-bis[hydroxy-di(phenanthren-9-yl)methyl]-2,2-dimethyl-1,3-dioxolane (abbreviation: R-DOL-Pn)>

A synthesis scheme of R-DOL-Pn represented by the structural formula (101) is shown in (L-1) below.

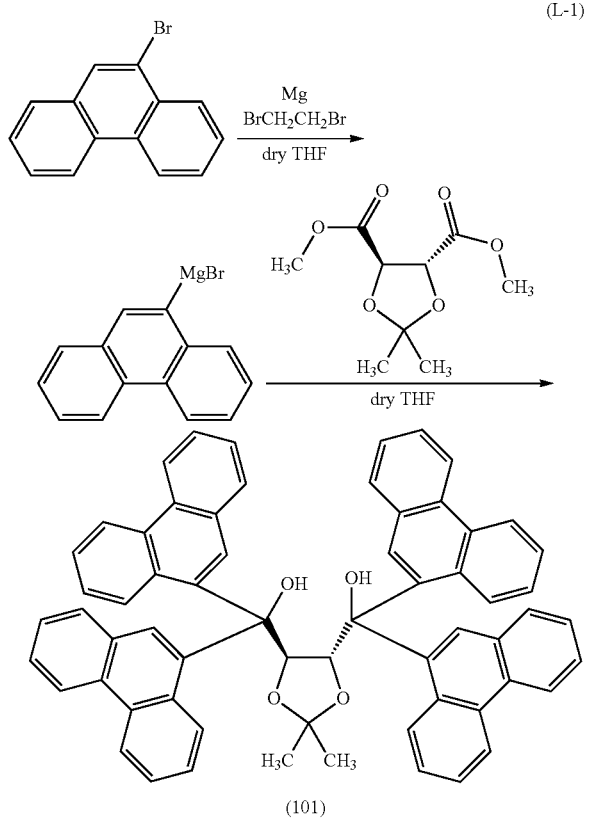

(L-1)

(101)

In a 200-mL three-neck flask was put 2.3 g (95 mmol) of magnesium, and the atmosphere in the flask was replaced with nitrogen. Into this mixture were added 50 mL of dehydrated tetrahydrofuran and 0.5 mL of dibromoethane, and the mixture was stirred. Into this mixture was gradually added a solution obtained by dissolving 25 g (97 mmol) of 9-bromophenanthrene in 50 mL of dehydrated tetrahydrofuran with a dropping funnel while the mixture was being refluxed. After the dropping, this mixture was refluxed under a nitrogen stream at 80° C. for two hours. After a predetermined time, this mixture was returned to room temperature. Into this mixture was gradually added a solution obtained by dissolving 3.6 mL (20 mmol) of (R,R)-2,3-O-isopropylidene-L-tartaric acid dimethyl ester in 10 mL of dehydrated tetrahydrofuran with a dropping funnel while the mixture was being refluxed. After the dropping, this mixture was refluxed under a nitrogen stream at 80° C. for an hour. After a predetermined time, into this mixture were added methanol, water, and dilute hydrochloric acid sequentially, and an aqueous layer of this mixture was extracted with toluene. The obtained extracted solution and an organic layer were combined, washed with a saturated aqueous solution of sodium hydrogen carbonate and saturated saline, and dried with magnesium sulfate. The mixture was separated by gravity filtration, and the obtained filtrate was concentrated to give an oily yellow substance. This oily substance was purified by silica gel column chromatography (developing solvent: toluene). The obtained fraction was concentrated to give an oily yellow substance. This oily substance was purified by high performance liquid chromatography (developing solvent: chloroform) to give a yellow solid. This solid was recrystallized with toluene, so that 10 g of a white solid, which was a target substance, was obtained in a yield of 58%.

This application is based on Japanese Patent Application serial no. 2011-275378 filed with Japan Patent Office on Dec. 16, 2011, the entire contents of which are hereby incorporated by reference.

What is claimed is:

1. A liquid crystal composition comprising:
a liquid crystal;
1,4:3,6-dianhydro-2,5-bis[4-(n-hexyl-1-oxy)benzoic acid]sorbitol represented by a structural formula (100) as a first chiral agent;
(4R,5R)-4,5-bis[hydroxy-di(phenanthren-9-yl)methyl]-2,2-dimethyl-1,3-dioxolane represented by a structural formula (101) as a second chiral agent; and

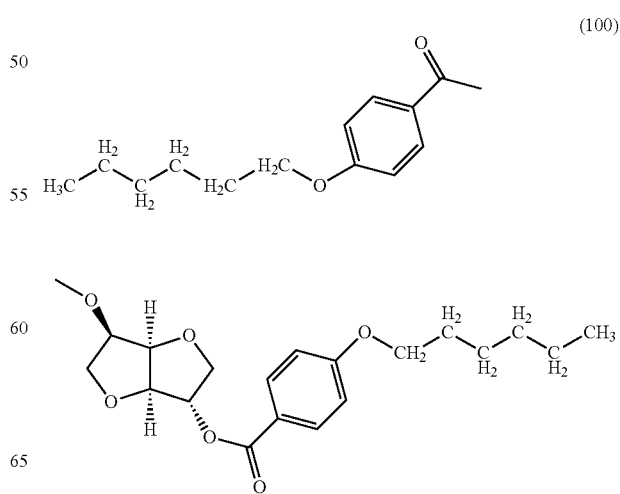

(100)

-continued

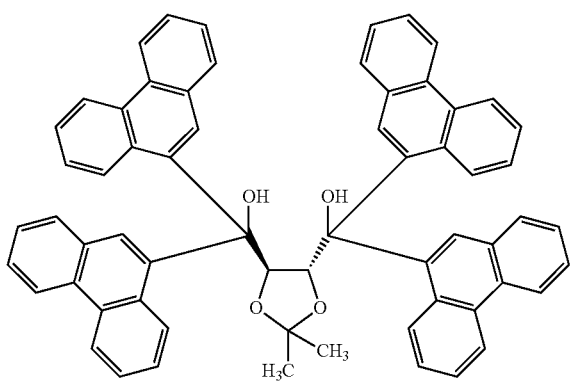

a polymerizable monomer and a polymerization initiator.

2. The liquid crystal composition according to claim 1 exhibiting a blue phase.

3. The liquid crystal composition according to claim 1 having a temperature range within which a blue phase appears higher than 3.9° C. and lower than 5.1° C.

4. The liquid crystal composition according to claim 1 having a helical twisting power of 80 µm$^{-1}$ or higher.

5. A liquid crystal element comprising:
a first substrate and a second substrate facing each other;
a pair of electrodes configured to apply an electric field between the first substrate and the second substrate;
a liquid crystal composition between the first substrate and the second substrate, the liquid crystal composition comprising:
a liquid crystal;
1,4:3,6-dianhydro-2,5-bis[4-(n-hexyl-1-oxy)benzoic acid]sorbitol represented by a structural formula (100) as a first chiral agent; and
(4R,5R)-4,5-bis[hydroxy-di(phenanthren-9-yl)methyl]-2,2-dimethyl-1,3-dioxolane represented by a structural formula (101) as a second chiral agent; and
a polymer contained in the liquid crystal composition

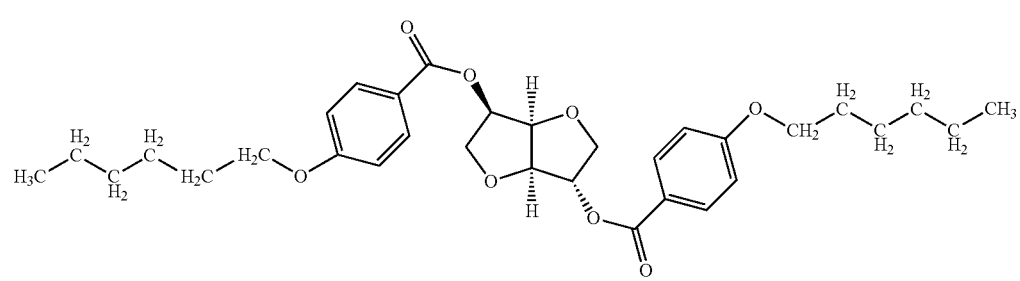

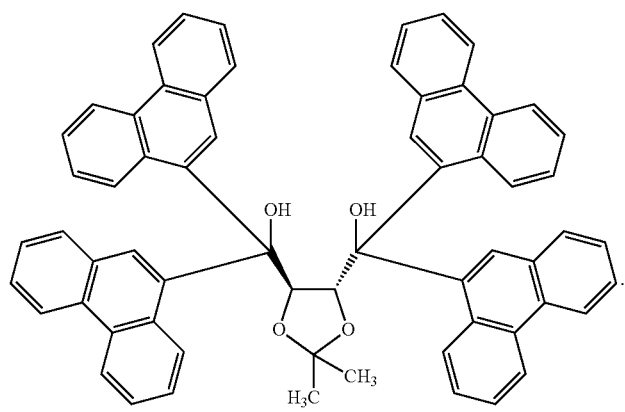

6. The liquid crystal element according to claim 5, wherein the liquid crystal composition exhibits a blue phase.

7. The liquid crystal element according to claim 5, wherein the liquid crystal composition has a temperature range within which a blue phase appears higher than 3.9° C. and lower than 5.1° C.

8. The liquid crystal element according to claim 5, wherein the liquid crystal composition has a helical twisting power of 80 μm$^{-1}$ or higher.

a liquid crystal;

1,4:3,6-dianhydro-2,5-bis[4-(n-hexyl-1-oxy)benzoic acid]sorbitol represented by a structural formula (100) as a first chiral agent; and (4R,5R)-4,5-bis[hydroxy-di(phenanthren-9-yl)methyl]-2,2-dimethyl-1,3-dioxolane represented by a structural formula (101) as a second chiral agent; and a polymer contained in the liquid crystal composition

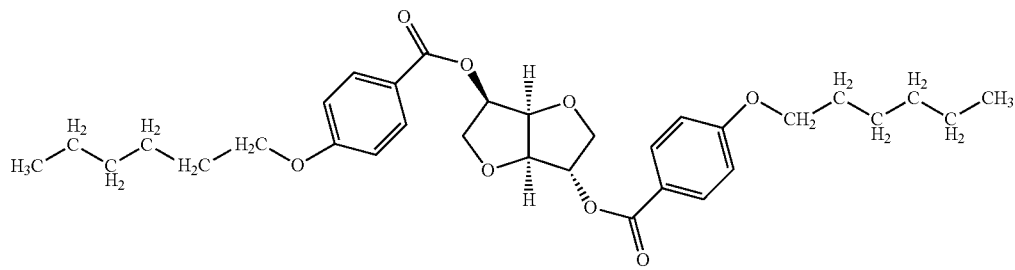

(100)

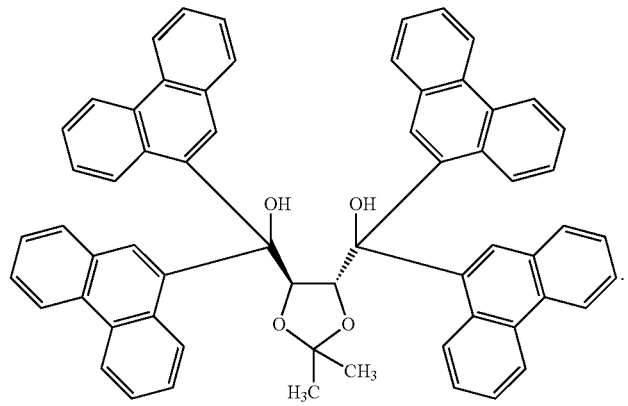

(101)

9. The liquid crystal element according to claim 5, wherein a blue phase keeps appearing after a pressing force endurance test.

10. The liquid crystal element according to claim 5, wherein a blue phase keeps appearing after pressing a curved surface of a hemisphere having a diameter of 0.5 mm on one of the substrates with a force of 3 N for about 3 s.

11. The liquid crystal element according to claim 5, wherein a blue phase keeps appearing after pressing a curved surface of a hemisphere having a diameter of 0.5 mm on one of the substrates with a force of 10 N for about 3 s.

12. A liquid crystal display device comprising the liquid crystal element according to claim 5.

13. A liquid crystal display module comprising:

a first substrate and a second substrate facing each other;

a pixel portion comprising a pair of electrodes configured to apply an electric field between the first substrate and the second substrate;

a driver circuit configured to drive the pixel portion;

a connector configured to connect the driver circuit to an external circuit;

a liquid crystal composition between the first substrate and the second substrate, the liquid crystal composition comprising:

14. The liquid crystal display module according to claim 13, wherein the liquid crystal composition exhibits a blue phase.

15. The liquid crystal display module according to claim 13, wherein the liquid crystal composition has a temperature range within which a blue phase appears higher than 3.9° C. and lower than 5.1° C.

16. The liquid crystal display module according to claim 13, wherein the liquid crystal composition has a helical twisting power of 80 μm$^{-1}$ or higher.

17. The liquid crystal display module according to claim 13, wherein a blue phase keeps appearing after a pressing force endurance test.

18. The liquid crystal display module according to claim 13, wherein a blue phase keeps appearing after pressing a curved surface of a hemisphere having a diameter of 0.5 mm on one of the substrates with a force of 3 N for about 3 s.

19. The liquid crystal display module according to claim 13, wherein a blue phase keeps appearing after pressing a curved surface of a hemisphere having a diameter of 0.5 mm on one of the substrates with a force of 10 N for about 3 s.

20. A liquid crystal display device comprising the liquid crystal display module according to claim 13.

* * * * *